ABSTRACT
United States Patent Office 3,116,287
Patented Dec. 31, 1963

3,116,287
Δ⁴ AND Δ¹,⁴ DERIVATIVES OF 16α-FLUORO-STEROID-[3,2-c]PYRAZOLES OF THE PREGNANE SERIES
Ralph F. Hirschmann, Scotch Plains, and Arthur A. Patchett, Metuchen, N.J., assignors to Merck & Co., Inc., Rahway, N.J., a corporation of New Jersey
No Drawing. Filed June 20, 1962, Ser. No. 203,713
15 Claims. (Cl. 260—239.8)

This invention is concerned generally with novel 4-pregneno- and 4,6-pregnadieno-[3,2-c]pyrazole compounds, and with processes of preparing the same. More particularly, it relates to novel 16α-fluoro-17α-hydroxy-20-oxo-4-pregneno- and 4,6-pregnadieno-[3,2-c]pyrazole compounds and to processes of making these compounds starting from the corresponding 16α-fluoro-17α,21-dihydroxy-4-pregnene- and 4,6-pregnadiene 3,20-dione.

These novel steroids may be chemically represented by structures A and B and the analogous Δ⁴,⁶-structures.

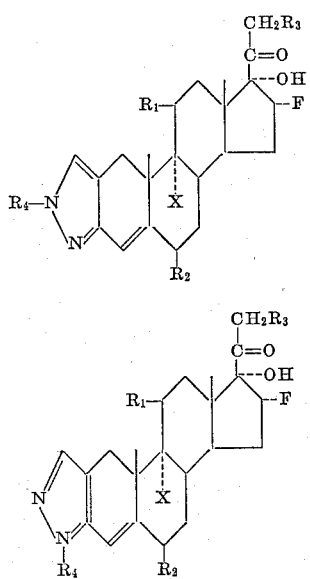

wherein $R_1$ is β-halogen, β-hydroxy or keto, but β-halogen is present at $R_1$ only when X is halogen, $R_2$ is halogen, hydrogen or methyl, $R_3$ is hydrogen, hydroxy, acyloxy or fluoro, $R_4$ is hydrogen, acyl, alkyl, cycloalkyl, aralkyl, aryl, a heterocyclic nucleus or substituted derivatives thereof, and X is hydrogen or halogen, and wherein any acyl group present as an acyloxy group at $R_3$ may be the same or different from any acyl group present at $R_4$.

N-substituted-pyrazole compounds having structure "A" are herein designated as the 1'-substituted [3,2-c]pyrazoles, and N-substituted-pyrazole compounds having structure "B" are designated as the 2'-substituted-[3,2-c] pyrazoles.

The above defined [3,2-c]pyrazoles produced in accordance with the present invention possess high anti-inflammatory activity, and are especially effective for the treatment of arthritis and related diseases since they can be administered for their cortisone-like action in low dosage thereby minimizing undesirable side effects.

In preparing our novel chemical compounds, the starting material utilized is a 16α-fluoro-17α,21-dihydroxy-4-pregnene-3,20-dione which may be identified by the following structural formula:

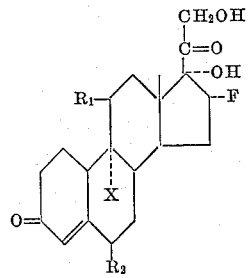

or a Δ⁴,⁶-analogue of compounds having the above structure, wherein $R_1$ is β-hydroxy or β-halogen, but β-halogen is present at $R_1$ only when X is halogen, $R_2$ is hydrogen, halogen or methyl, and X is hydrogen or halogen. However, it is clear to those skilled in the art that other starting materials may be similarly converted to the desired end products.

The above-named starting materials for our invention are prepared by the methods described in Flow Sheets A–D and in Examples 9–21.

The starting materials defined above will react with aqueous formaldehyde solutions in the presence of strong acid to form compounds having the formula:

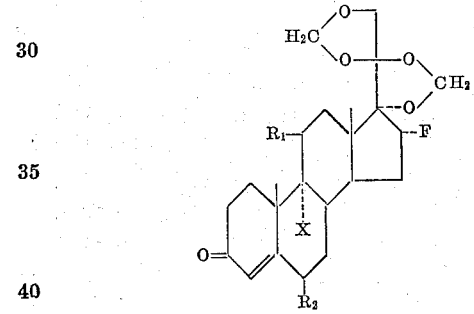

or the Δ⁴,⁶-analogues of compounds having the above structure, wherein $R_1$, $R_2$ and X have the significance above defined. For example, cold, concentrated HCl and formalin are added to a stirred suspension of the steroid in chloroform, cooled to about 0° C. The mixture is then allowed to come to room temperature and stirred for several hours to afford the corresponding 17α,20,20,21-bis(methylenedioxy)-derivative.

Compare also Flow Sheet B, Compound 14 which the Δ⁴,⁶-17α,20,20,21 - bis(methylenedioxy) - compounds are prepared by the action of chloranil on the corresponding Δ⁴-compounds.

In a preferred embodiment of our invention, the 17α,20,20,21 - bis(methylenedioxy) compound which has the following formula:

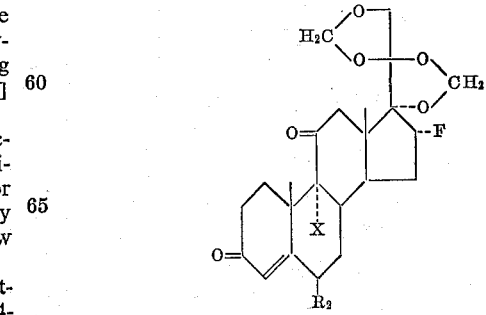

or the Δ⁴,⁶-analogue of a compound having the above structure, wherein R₂ and X have the significance above defined, is prepared by oxidation of the corresponding 11β - hydroxy - 17α,20,20,21 - bis(methylenedioxy)-compound, for example, with chromium trioxide in a non-aqueous base such as pyridine. If desired, however, the 17α,20,20,21-bis(methylenedioxy)-16α-fluoro-4-pregnene-(or 4,6-pregnadiene)-3,11-dione may be prepared directly by the reaction of the 16α-fluoro-17α,21-dihydroxy-4-pregnene-(or 4,6-pregdiene)-3,11,20-trione with formaldehyde solution in the presence of an acid as described in the preceding step.

Upon treatment of the 17α,20,20,21-bis-(methylenedioxy)-compound with an alkyl formate and sodium hydride in an inert atmosphere there is formed the corresponding 2-hydroxymethylene derivative which has the following structure, or the Δ⁴,⁶-analogue of a compound having the following structure:

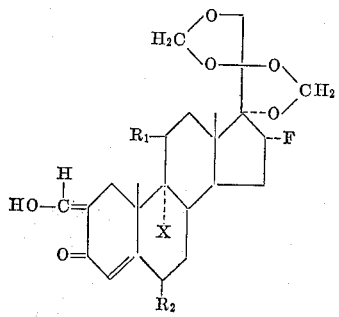

wherein R₁ is β-halogen, β-hydroxy and/or β-formyloxy-, or keto-, but β-halogen is present at R₁ only when X is halogen, and R₂ and X have the significance above defined. In a preferred embodiment of our invention, the steroid is dissolved in a solvent such as benzene and the resulting solution is cooled to room temperature and treated with ethyl formate. The air in the system is replaced with nitrogen, sodium hydride is added and the mixture is stirred at room temperature for several hours.

The 17α,20,20,21-bis(methylenedioxy)-16α-fluoro-2-hydroxymethylene-4-pregnene-(or 4,6-pregnadiene)-3 - one reacts with hydrazine in an inert atmosphere to form the corresponding 4-pregneno-(or 4,6-pregnadieno)-[3,2-c] pyrazole.

Upon treatment of a 17α,20,20,21-bis-(methylenedioxy)-16α-fluoro-2-hydroxymethylene-4-pregnene-(or 4,6-pregnadiene)-3-one with a lower alkanol in the presence of an acidic reagent such as a p-toluenesulfonic acid the corresponding 2-alkoxymethylene-derivative is formed. When the latter compound is reacted with a monosubstituted hydrazine, the corresponding N-substituted-[3,2-c] pyrazole compounds are formed. The N-substituted-[3,2-c]pyrazoles having structure "A" are designated as the 1'-substituted-[3,2-c]pyrazoles, and the N-substituted-pyrazole compounds having structure "B" are designated as the 2'-substituted-[3,2-c] pyrazoles. The corresponding Δ⁴,⁶-steroids are

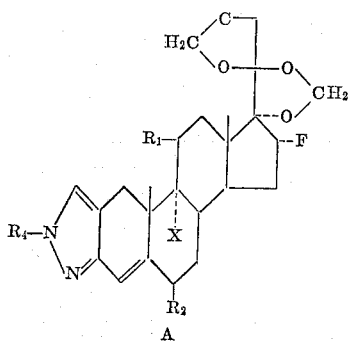

A

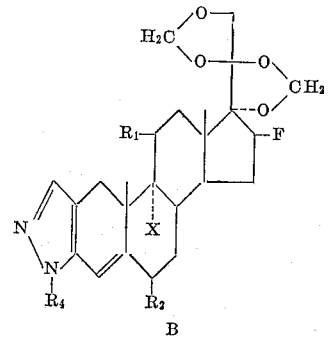

B similarly designated. R₁, R₂, and X have the significance above defined, and R₄ is heterocyclic alkyl, cycloalkyl, aralkyl or an aryl group. The products formed may be separated by chromatography.

Upon treatment of a 17α,20,20,21-bis-(methylenedioxy)-16α-fluoro-2-hydroxymethylene-4-pregnene-(or 4, 6-pregnadiene)-3-one compound directly with a monosubstituted arylhydrazine, without the intermediate formation of the 2-alkoxymethylene-derivative, one isomer is generally formed in preponderant amounts, whereas when reacting the 2-alkoxymethylene compound with a monosubstituted arylhydrazine, significant amounts of both isomers are obtained. When these reactions take place with monosubstituted alkylhydrazines, mixtures may be obtained when starting with the 2-hydroxymethylene-steroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of alcohol a solution of the 2-hydroxymethylene-compound from which acid has not been completely removed.

Among the monosubstituted hydrazines which may be used for the process of our invention are: alkylhydrazines, such as methylhydrazine, ethylhydrazine, propylhydrazines, butylhydrazines, β-hydroxyethylhydrazine, cycloalkylhydrazines; arylhydrazines including phenylhydrazine and the substituted phenylhydrazines, such as o-, m-, and p-halophenylhydrazines, o-, m-, and p-tolylhydrazines, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine oxide, 2-hydrazinopyrimidine; 2-hydrazinothiophene and 3-hydrazinothiophene; aralkylhydrazines, such as benzylhydrazine and phenylethylenehydrazine.

There are thus produced the corresponding N-substituted-4-pregneno-[3,2-c]pyrazoles including: N - alkyl such as N-methyl-, N-ethyl-, N-butyl-, N-propyl-, N-(β-hydroxyethyl-)-; N-cycloalkyl-; N-aryl- which may be derived from any aromatic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1''-naphthyl)-, N-(2''-pyridyl)-, N-(3''-pyridyl)-, N-(4''-pyridyl)-, N-(4-pyridyloxide)-, N-(2''-pyrimidyl)-, N-(2''-thiophene)- and N-(3''-thiophene)-: N-aralkyl-, such as N-benzyl- and N-phenylethenyl-[3,2-c]pyrazoles.

The N-alkyl-[3,2-c]pyrazoles may also be prepared by direct alkylation of the N-unsubstituted 4-pregneno-[3,2-c]pyrazoles.

A 17α,20,20,21-bis(methylenedioxy)-16α-fluoro - 11β-hydroxy-4-pregneno-(or 4,6-pregnadieno)-[3,2-c]pyrazoles which have a 9α-halo-substituent are preferably prepared by the following alternate route.

Using the procedures described above, the 9α-halo-

16α-fluoro-11β,17α,21 - trihydroxy-4-pregnene-(or 4,6-pregnadiene)-3,20-dione is converted into the corresponding 17α,20,20,21 - bis(methylenedioxy) - derivative. The latter compound is then oxidized to the 17α,20,20,21-bis-(methylenedioxy)-16α-fluoro-9α-halo-4-pregnene-(or 4,6-pregnadiene)-3,11-dione, which is reacted with ethyl formate and sodium hydride to form the 2-hydroxymethylene-derivative. The latter compound is reacted with hydrazine, or a mono-substituted hydrazine, to give the corresponding 17α,20,20,21-bis(methylenedioxy) - 16α-fluoro-9α-halo-11-oxo-4-pregneno-(or 4,6-pregnadieno)-[3,2-c]pyrazole compound, or the N-substituted derivative thereof. The latter compound is then reduced to the corresponding 11β-hydroxy-derivative, for example, by adding a saturated solution of sodium borohydride to a solution of the steroid in a mixture of triethylamine and isopropyl alcohol to which we prefer to add a little water, and allowing the mixture to stand over night. (Compare Example 5.)

Upon treatment of any of the above described 17α, 20, 20,21-bis(methylenedioxy)-compounds with a dilute organic acid, for example, a 60% aqueous solution of formic acid, the 17α,20,20,21-bis(methylenedioxy)-protecting group is removed and there is obtained the corresponding 16α-fluoro-17α,21-dihydroxy-20-oxo-4-pregneno-[3,2-c]pyrazoles which are represented by structures A and B, and the Δ$^{4,6}$-analogues thereof.

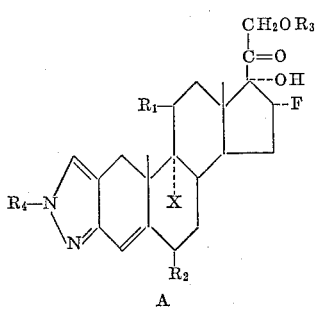

A

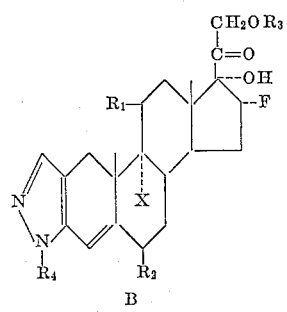

B wherein $R_1$ is β-halogen, β-hydroxy or keto, but β-halogen is present at $R_1$ only when X is halogen; $R_2$ and X have the meaning described above and wherein $R_4$ is acyl, alkyl, cycloalkyl, aryl, aralkyl, a heterocyclic nucleus, or substituted derivatives thereof, and $R_3$ is hydrogen, an acyl group corresponding to the organic acid used in this reaction, or a mixture of the two.

Any acyl groups present at $R_3$ and/or at $R_4$ may be removed by treating the steroid with sodium methoxide in methanol at room temperature to form the corresponding 16α-fluoro-17α,21-dihydroxy - 20 - oxo-4-pregneno-(or 4,6-pregnadieno)-[3,2-c]pyrazole. Acyl groups present at the $R_4$ position may be selectively removed by treatment with aqueous acetic acid.

The compounds of our invention include, among others, the following:

16α-fluoro-11β,17α,21-trihydroxy-20-oxo-4-pregneno-[3,2-c]pyrazole,
16α-fluoro-11β,17α,21-trihydroxy-6α-methyl-20-oxo-4-pregneno-[3,2-c]pyrazole,
6α,16α-difluoro-11β,17α,21-trihydroxy-20-oxo-4-pregneno-[3,2-c]pyrazole,
6α-chloro-16α-fluoro-11β,17α,21-trihydroxy-20-oxo-4-pregneno-[3,2-c]pyrazole,
9α,16α-difluoro-11β,17α,21-trihydroxy-20-oxo-4-pregneno-[3,2-c]pyrazole,
9α,16α-difluoro-11β,17α,21-trihydroxy-6α-methyl-20-oxo-4-pregneno-[3,2-c]pyrazole,
6α,9α,16α-trifluoro-11β,17α,21-trihydroxy-20-oxo-4-pregneno-[3,2-c]pyrazole,
9α,16α-difluoro-6α-chloro-11β,17α,21-trihydroxy-20-oxo-4-pregneno-[3,2-c]pyrazole,
16α-fluoro-11β,17α,21-trihydroxy-20-oxo-2'-phenyl-4-pregneno-[3,2-c]pyrazole,
16α-fluoro-11β,17α,21-trihydroxy-6α-methyl-20-oxo-2'-phenyl-4-pregneno-[3,2-c]pyrazole,
6α,16α-difluoro-11β,17α,21-trihydroxy-20-oxo-2'-phenyl-4-pregneno-[3,2-c]pyrazole,
6α-chloro-16α-fluoro-11β,17α,21-trihydroxy-20-oxo-2'-phenyl-4-pregneno-[3,2-c]pyrazole,
9α,16α-difluoro-11β,17α,21-trihydroxy-20-oxo-2'-phenyl-4-pregneno-[3,2-c]pyrazole,
9α,16α-difluoro-11β,17α,21-trihydroxy-6α-methyl-20-oxo-2'-phenyl-4-pregneno-[3,2-c]pyrazole,
6α,9α,16α-trifluoro-11β,17α,21-trihydroxy-20-oxo-2'-phenyl-4-pregneno-[3,2-c]pyrazole,
9α,16α-difluoro-6α-chloro-11β,17α,21-trihydroxy-20-oxo-2'-phenyl-4-pregneno-[3,2-c]pyrazole,
16α-fluoro-2'-(p-fluorophenyl)-11β,17α,21-trihydroxy-20-oxo-4-pregneno-[3,2-c]pyrazole,
16α-fluoro-2'-(p-fluorophenyl)-11β,17α,21-trihydroxy-6α-methyl-20-oxo-4-pregneno-[3,2-c]pyrazole,
6α,16α-difluoro-2'-(p-fluorophenyl)-11β,17α,21-trihydroxy-20-oxo-4-pregneno-[3,2-c]pyrazole,
6α-chloro-16α-fluoro-2'-(p-fluorophenyl)-11β,17α,21-trihydroxy-20-oxo-4-pregneno-[3,2-c]pyrazole,
9α,16α-difluoro-2'-(p-fluorophenyl)-11β,17α,21-trihydroxy-20-oxo-4-pregneno-[3,2-c]pyrazole,
9α,16α-difluoro-2'-(p-fluorophenyl)-11β,17α,21-trihydroxy-6α-methyl-20-oxo-4-pregneno-[3,2-c]pyrazole,
6α,9α,16α-trifluoro-2'-(p-fluorophenyl)-11β,17α,21-trihydroxy-20-oxo-4-pregneno-[3,2-c]pyrazole,
6α-chloro-9α,16α-difluoro-2'-(p-fluorophenyl)-11β,17α,21-trihydroxy-20-oxo-4-pregneno-[3,2-c]pyrazole,
9α,11β-dichloro-16α-fluoro-21-hydroxy-20-oxo-4-pregneno-[3,2-c]pyrazole,
9α,11β-dichloro-16α-fluoro-21-hydroxy-6α-methyl-20-oxo-4-pregneno-[3,2-c]pyrazole,
9α,11β-dichloro-6α,16α-difluoro-21-hydroxy-20-oxo-4-pregneno-[3,2-c]pyrazole,
6α,9α,11β-trichloro-16α-fluoro-21-hydroxy-20-oxo-4-pregneno-[3,2-c]pyrazole,
16α-fluoro-11β,17α,21-trihydroxy-20-oxo-4,6-pregnadieno-[3,2-c]pyrazole,
16α-fluoro-11β,17α,21-trihydroxy-6-methyl-20-oxo-4,6-pregnadieno-[3,2-c]pyrazole,
6,16α-difluoro-11β,17α,21-trihydroxy-20-oxo-4,6-pregnadieno-[3,2-c]pyrazole,
6-chloro-16α-fluoro-11β,17α,21-trihydroxy-20-oxo-4,6-pregnadieno-[3,2-c]pyrazole,
9α,16α-difluoro-11β,17α,21-trihydroxy-20-oxo-4,6-pregnadieno-[3,2-c]pyrazole,
9α,16α-difluoro-11β,17α,21-trihydroxy-6-methyl-20-oxo-4,6-pregnadieno-[3,2-c]pyrazole,
6,9α,16α-trifluoro-11β,17α,21-trihydroxy-20-oxo-4,6-pregnadieno-[3,2-c]pyrazole,
9α,16α-difluoro-6-chloro-11β,17α,21-trihydroxy-20-oxo-4,6-pregnadieno-[3,2-c]pyrazole,
16α-fluoro-11β,17α,21-trihydroxy-20-oxo-2'-phenyl-4,6-pregnadieno-[3,2-c]pyrazole, 16α-fluoro-11β,17α,21-trihydroxy-6-methyl-20-oxo-2'-phenyl-4,6-pregnadieno-[3,2-c]pyrazole,
6,16α-difluoro-11β,17α,21-trihydroxy-20-oxo-2'-phenyl-4,6-pregnadieno-[3,2-c]pyrazole,
6-chloro-16α-fluoro-11β,17α,21-trihydroxy-20-oxo-2'-phenyl-4,6-pregnadieno-[3,2-c]pyrazole,
9α,16α-difluoro-11β,17α,21-trihydroxy-20-oxo-2'-phenyl-4,6-pregnadieno-[3,2-c]pyrazole,
9α,16α-difluoro-11β,17α,21-trihydroxy-6-methyl-20-oxo-2'-phenyl-4,6-pregnadieno-[3,2-c]pyrazole,
6,9α,16α-trifluoro-11β,17α,21-trihydroxy-20-oxo-2'-phenyl-4,6-pregnadieno-[3,2-c]pyrazole,
6-chloro-9α,16α-difluoro-11β,17α,21-trihydroxy-20-oxo-2'-phenyl-4,6-pregnadieno-[3,2-c]pyrazole,
16α-fluoro-2'-(p-fluorophenyl)-11β,17α,21-trihydroxy-20-oxo-4,6-pregnadieno-[3,2-c]pyrazole,
16α-fluoro-2'-(p-fluorophenyl)-11β,17α,21-trihydroxy-6-methyl-20-oxo-4,6-pregnadieno-[3,2-c]pyrazole,
6,16α-difluoro-2'-(p-fluorophenyl)-11β,17α,21-trihydroxy-20-oxo-4,6-pregnadieno-[3,2-c]pyrazole,
6-chloro-16α-fluoro-2'-(p-fluorophenyl)-11β,17α,21-trihydroxy-20-oxo-4,6-pregnadieno-[3,2-c]pyrazole,
9α,16α-difluoro-2'-(p-fluorophenyl)-11β,17α,21-trihydroxy-20-oxo-4,6-pregnadieno-[3,2-c]pyrazole,
9α,16α-difluoro-2'-(p-fluorophenyl)-11β,17α,21-trihydroxy-6-methyl-20-oxo-4,6-pregnadieno-[3,2-c]pyrazole,
6,9α,16α-trifluoro-2'-(p-fluorophenyl)-11β,17α,21-trihydroxy-20-oxo-4,6-pregnadieno-[3,2-c]pyrazole,
6-chloro-9α,16α-difluoro-2'-(p-fluorophenyl)-11β,17α,21-trihydroxy-20-oxo-4,6-pregnadieno-[3,2-c]pyrazole,
9α,11β-dichloro-16α-fluoro-21-hydroxy-20-oxo-4,6-pregneno-[3,2-c]pyrazole,
9α,11β-dichloro-16α-fluoro-21-hydroxy-6-methyl-20-oxo-4,6-pregneno-[3,2-c]pyrazole,
9α,11β-dichloro-6,16α-difluoro-21-hydroxy-20-oxo-4,6-pregneno-[3,2-c]pyrazole,
6,9α,11β-trichloro-16α-fluoro-21-hydroxy-20-oxo-4,6-pregneno-[3,2-c]pyrazole,
as well as the 1'- and 2'-alkyl-, the 1'- and 2'-cycloalkyl-, the 1'- and 2'-aryl-, and the 1'- and 2'-aralkyl-derivatives of all of the above named compounds.

The 21-acyl derivatives of the above described 16α-fluoro-17α,21-dihydroxy-20-oxo-4-pregneno-(or 4,6-pregnadieno)-[3,2-c]-pyrazoles in which $R_4$ is H may be prepared by heating an N-acyl-16α-fluoro-17α,21-dihydroxy-20-oxo-4-pregneno-(or 4,6-pregnadieno)-[3,2-c]pyrazole 21-acylate with aqueous acetic acid, whereupon the N-acyl group is selectively removed.

The N-acyl-21-acylate derivatives of the above described 16α-fluoro-17α,21-dihydroxy-20-oxo-4-pregneno-(or 4,6-pregnadieno)-[3,2-c]pyrazoles in which both acyl groups are the same may be prepared by reacting a 16α-fluoro-17α,21-dihydroxy-20-oxo-4-pregneno-(or 4,6-pregnadieno)-[3,2-c]pyrazole with two equivalents of an acylating agent.

The N-acyl-21-acylate derivatives of the above described 16α-fluoro-17α,21-dihydroxy-20-oxo-4-pregneno-(or 4,6-pregnadieno)-[3,2-c]pyrazoles in which the acyl groups are different are prepared by reaction of 16α-fluoro-17α,21-dihydroxy-20-oxo-4-pregneno-(or 4,6-pregnadieno)-[3,2-c]pyrazole 21-acylate with an acylating agent in which the acyl group of the acylating agent is different from the acyl group already present at the 21-position of the pyrazole.

Acylating agents which can be used for this purpose include a lower hydrocarbon carboxylic acid acylating agent such as benzoic anhydride, or tertiary butyl acetyl chloride; a lower alkanoic anhydride or lower alkanoyl halide such as acetic anhydride, propionic anhydrides or acetyl chloride; or a polybasic anhydride such as β,β-dimethylglutaric anhydride, succinic anhydride and the like, in the presence of an organic base such as pyridine.

The 16α - fluoro-17α,21-dihydroxy-20-oxo-4-pregneno- (or 4,6 - pregnadieno)-[3,2 - c]pyrazole is reacted with methane sulfonyl chloride in a nonaqueous base to form the 21-mesylate. A steroid in which $R_4$ is hydrogen is first converted to the N-carbamyl-derivative before undergoing this reaction.

The 16α - fluoro-17α,21-dihydroxy-20-oxo-4-pregneno- (or 4,6-pregnadieno) - [3,2 - c]pyrazole 21-mesylate is heated with an alkali iodide to form the 21-iodo-compound. In a preferred method for carrying out this reaction, sodium iodide is added to the steroid dissolved in acetone and the resulting mixture is heated at reflux temperature for approximately one hour.

The 16α-fluoro-17α-hydroxy-21-iodo - 20 - oxo-4-pregneno-(or 4,6-pregnadieno)-[3,2-c]pyrazole is heated with an alkali bisulfite in a solvent to form the corresponding 21-desoxy-compound which has structure A or B, wherein $R_4$ is carbamyl, or alkyl, cycloalkyl, aralkyl, aryl, a heterocyclic nucleus or substituted derivatives thereof,

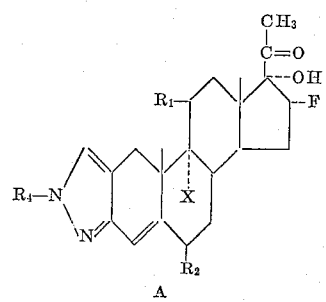

A

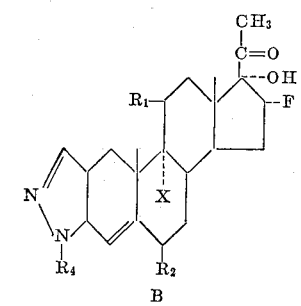

B wherein $R_1$, $R_2$, and X have the significance above defined. A preferred method is to add sodium bisulfite to a suspension of the steroid in aqueous ethanol and then heat the mixture under reflux for a period of about an hour.

Any carbamyl group present at $R_4$ may be removed by treating the steroid in glacial acetic acid with sodium nitrite.

Thus the novel compounds of our invention which are formed from the above reactions include:

16α-fluoro-11β,17α-dihydroxy-20-oxo-4-pregneno-[3,2-c]pyrazole,
16α-fluoro-11β,17α-dihydroxy-6α-methyl-20-oxo-4-pregneno-[3,2-c]pyrazole,
6α,16α-difluoro-11β,17α-dihydroxy-20-oxo-4-pregneno-[3,2-c]pyrazole,
6α-chloro-16α-fluoro-11β,17α-dihydroxy-20-oxo-4-pregneno-[3,2-c]pyrazole,
9α,16α-difluoro-11β,17α-dihydroxy-20-oxo-4-pregneno-[3,2-c]pyrazole,
9α,16α-difluoro-11β,17α-dihydroxy-6α-methyl-20-oxo-4-pregneno-[3,2-c]pyrazole,
6α,9α,16α-trifluoro-11β,17α-dihydroxy-20-oxo-4-pregneno-[3,2-c]pyrazole,
6α-chloro-9α,16α-difluoro-11β,17α-dihydroxy-20-oxo-4-pregneno-[3,2-c]pyrazole, 16α-fluoro-11β,17α-dihydroxy-20-oxo-2′-phenyl-4-pregneno-[3,2-c]pyrazole,
16α-fluoro-11β,17α-dihydroxy-6α-methyl-20-oxo-2′-phenyl-4-pregneno-[3,2-c]pyrazole,
6α,16α-difluoro-11β,17α-dihydroxy-20-oxo-2′-phenyl-4-pregneno-[3,2-c]pyrazole,
6α-chloro-16α-fluoro-11β,17α-dihydroxy-20-oxo-2′-phenyl-4-pregneno-[3,2-c]pyrazole,
9α,16α-difluoro-11β,17α-dihydroxy-20-oxo-2′-phenyl-4-pregneno-[3,2-c]pyrazole,
9α,16α-difluoro-11β,17α-dihydroxy-6α-methyl-20-oxo-2′-phenyl-4-pregneno-[3,2-c]pyrazole,
6α,9α,16α-trifluoro-11β,17α-dihydroxy-20-oxo-2′-phenyl-4-pregneno-[3,2-c]pyrazole,
6α-chloro-9α,16α-difluoro-11β,17α-dihydroxy-20-oxo-2′-phenyl-4-pregneno-[3,2-c]pyrazole,
16α-fluoro-2′-(p-fluorophenyl)-11β,17α-dihydroxy-20-oxo-4-pregneno-[3,2-c]pyrazole,
16α-fluoro-2′-(p-fluorophenyl)-11β,17α-dihydroxy-6α-methyl-20-oxo-4-pregneno-[3,2-c]pyrazole,
6α,16α-difluoro-2′-(p-fluorophenyl)-11β,17α-dihydroxy-20-oxo-4-pregneno-[3,2-c]pyrazole,
6α-chloro-16α-fluoro-2′-(p-fluorophenyl)-11β,17α-dihydroxy-20-oxo-4-pregneno-[3,2-c]pyrazole,
9α,16α-difluoro-2′-(p-fluorophenyl)-11β,17α-dihydroxy-20-oxo-4-pregneno-[3,2-c]pyrazole,
9α,16α-difluoro-2′-(p-fluorophenyl)11β,17α-dihydroxy-6α-methyl-20-oxo-4-pregneno-[3,2-c]pyrazole,
6α,9α,16α-trifluoro-2′-(p-fluorophenyl)-11β,17α-dihydroxy-20-oxo-4-pregneno-[3,2-c]pyrazole,
6α-chloro-9α,16α-difluoro-11β,17α-dihydroxy-2′-(p-fluorophenyl)-20-oxo-4-pregneno-[3,2-c]pyrazole,
9α,11β-dichloro-16α-fluoro-20-oxo-4-pregneno-[3,2-c]pyrazole,
9α,11β-dichloro-16α-fluoro-6α-methyl-20-oxo-4-pregneno-[3,2-c]pyrazole,
9α,11β-dichloro-6α,16α-difluoro-20-oxo-4-pregneno-[3,2-c]pyrazole,
6α,9α,11β-trichloro-16α-fluoro-20-oxo-4-pregneno-[3,2-c]pyrazole,
16α-fluoro-11β,17α-dihydroxy-20-oxo-4,6-pregnadieno-[3,2-c]pyrazole,
16α-fluoro-11β,17α-dihydroxy-6-methyl-20-oxo-4,6-pregnadieno-[3,2-c]pyrazole,
6,16α-difluoro-11β,17α-dihydroxy-20-oxo-4,6-pregnadieno-[3,2-c]pyrazole,
6-chloro-16α-fluoro-11β,17α-dihydroxy-20-oxo-4,6-pregnadieno-[3,2-c]pyrazole,
9α,16α-difluoro-11β,17α-dihydroxy-20-oxo-4,6-pregnadieno-[3,2-c]pyrazole,
9α,16α-difluoro-11β,17α-dihydroxy-6-methyl-20-oxo-4,6-pregnadieno-[3,2-c]pyrazole,
6,9α,16α - trifluoro-11β,17α-dihydroxy-20-oxo-4,6-pregnadieno-[3,2-c]pyrazole,
6-chloro-9α,16α-difluoro-11β,17α-dihydroxy-20-oxo-4,6-pregnadieno-[3,2-c]pyrazole,
16α-fluoro-11β,17α-dihydroxy-20-oxo-2′-phenyl-4,6-pregnadieno-[3,2-c]pyrazole,
16α-fluoro-11β,17α-dihydroxy-6-methyl-20-oxo-2′-phenyl-4,6-pregnadieno-[3,2-c]pyrazole,
6,16α-difluoro-11β,17α-dihydroxy-20-oxo-2′-phenyl-4,6-pregnadieno-[3,2-c]pyrazole,
6-chloro-16α-fluoro-11β,17α-dihydroxy-20-oxo-2′-phenyl-4,6-pregnadieno-[3,2-c]pyrazole,
9α,16α-difluoro-11β,17α-dihydroxy-20-oxo-2′-phenyl-4,6-pregnadieno-[3,2-c]pyrazole,
9α,16α-difluoro-11β,17α-dihydroxy-6-methyl-20-oxo-2′-phenyl-4,6-pregnadieno-[3,2-c]pyrazole,
6,9α,16α-trifluoro-11β,17α-dihydroxy-20-oxo-2′-phenyl-4,6-pregnadieno-[3,2-c]pyrazole,
16α-fluoro-2′-(p-fluorophenyl)-11β,17α-dihydroxy-20-oxo-4,6-pregnadieno-[3,2-c]pyrazole,
16α-fluoro-2′-(p-fluorophenyl)-11β,17α-dihydroxy-6-methyl-20-oxo-4,6-pregnadieno-[3,2-c]pyrazole,
6,16α-difluoro-2′-(p-fluorophenyl)-11β,17α-dihydroxy-20-oxo-4,6-pregnadieno-[3,2-c]pyrazole,
6-chloro-9α,16α-difluoro-11β,17α-dihydroxy-20-oxo-2′-phenyl-4,6-pregnadieno-[3,2-c]pyrazole,
6-chloro-16α-fluoro-2′-(p-fluorophenyl)-11β,17α-dihydroxy-20-oxo-4,6-pregnadieno-[3,2-c]pyrazole,
9α,16α-difluoro-2′-(p-fluorophenyl)-11β,17α-dihydroxy-20-oxo-4,6-pregnadieno-[3,2-c]pyrazole,
9α,16α-difluoro-2′-(p-fluorophenyl)-11β,17α-dihydroxy-6-methyl-20-oxo-4,6-pregnadieno-[3,2-c]pyrazole,
6,9α,16α-trifluoro-2′-(p-fluorophenyl)-11β,17α-dihydroxy-20-oxo-4,6-pregnadieno-[3,2-c]pyrazole,
6-chloro-9α,16α-difluoro-2′-(p-fluorophenyl)-11β,17α-dihydroxy-20-oxo-4,6-pregnadieno-[3,2-c]pyrazole,
9α,11β-dichloro-16α-fluoro-20-oxo-4,6-pregnadieno-[3,2-c]pyrazole,
9α,11β-dichloro-16α-fluoro-6-methyl-20-oxo-4,6-pregnadieno-[3,2-c]pyrazole,
9α,11β-dichloro-6,16α-difluoro-20-oxo-4,6-pregnadieno-[3,2-c]pyrazole,
6,9α,11β-trichloro-16α-flouro-20-oxo-4,6-pregnadieno-[3,2-c]pyrazole, as well as the 1′- and 2′-alkyl-, and the 1′- and 2′-cycloalkyl-, the 1′- and 2′-aryl-, the 1′- and 2′-aralkyl- and the N-acyl-derivatives of all of the above named compounds.

The 21-dihydrogen phosphate esters are prepared by the reaction of the corresponding 21-iodo compound with a mixture of silver phosphate and phosphoric acid. Both the mono- and dialkali metal salts may be obtained by neutralization of the dihydrogen phosphate ester with an alkali methoxide. Treatment with additional amounts of alkali methoxide will convert an N-acyl-steroid ($R_4$=acyl) into the free amine ($R_4$=H) dialkali metal salt from which the dihydrogen phosphate can be obtained by contacting with an ion exchange resin.

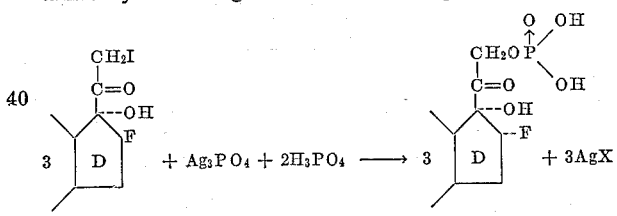

The A, B, C and pyrazole rings are not shown in the above equation, as the substituent groups on these rings do not affect the course of reaction and in general are unchanged during reaction.

The 16α,21 - difluoro-17α-hydroxy-20-oxo-4-pregneno- (or 4,6-pregnadieno)-[3,2-c]pyrazoles are prepared from the corresponding 16α-fluoro-17α,21-dihydroxy-20-oxo-4-pregneno-(or 4,6-pregnadieno)-[3,2-c]pyrazole 21-mesylate by heating with an alkali fluoride in a solvent to form a mixture of a 17α,21-epoxy-compound and the corresponding 21-fluoro compound. These compounds are separated by partition chromatography, or by chromatography on a weak adsorbent such as silica gel. There is thus obtained the 21-fluoro-derivatives of all of the compounds named (see column 8, 9 and 10, lines 60, 22).

The 21-fluoro-derivatives are represented by structures A and B and the analogous $\Delta^{4,6}$-structures

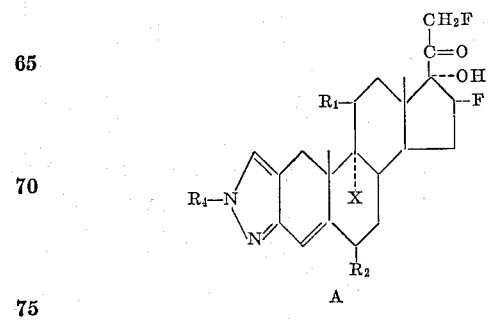

A

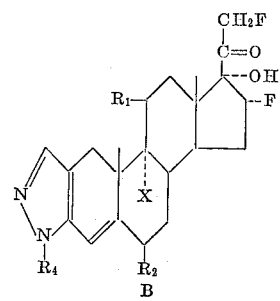

wherein $R_1$, $R_2$, $R_4$, and X have the significance above described.

All of the [3,2-c]pyrazoles described in the foregoing structures form salts such as the hydrochloride, sulfate, chlorate, perchlorate, picrate and trichloroacetate, on treatment with the corresponding acid. Formation of crystalline salts, especially the hydrochloride, provides a means of isolating the [3,2-c]pyrazoles.

A further embodiment of our invention comprises novel pharmaceutical compositions containing the novel [3,2-c] pyrazoles exemplified in the foregoing structures.

The 17α-acetoxy-9α,11β-dichloro-16α-fluoro-20-oxo-4-pregneno-(or 4,6-pregnadieno)-[3,2-c]pyrazoles are prepared from the 17α-hydroxy-9α,11β-dichloro-16α-fluoro-20-oxo-4-pregneno-(or 4,6-pregnadieno)-[3,2-c]pyrazoles by reacting first with acetic anhydride and p-toluenesulfonic acid to form the N-acetyl-21-acetate and then treating with methanolic sodium hydroxide to remove the N-acetate group. (Compare Example 22.)

Methods for the preparation of the starting materials used in the process of our invention are outlined in Flow Sheets A to D, detailed procedures for which are included in Examples 9 through 21.

STARTING MATERIALS

FLOW SHEET A

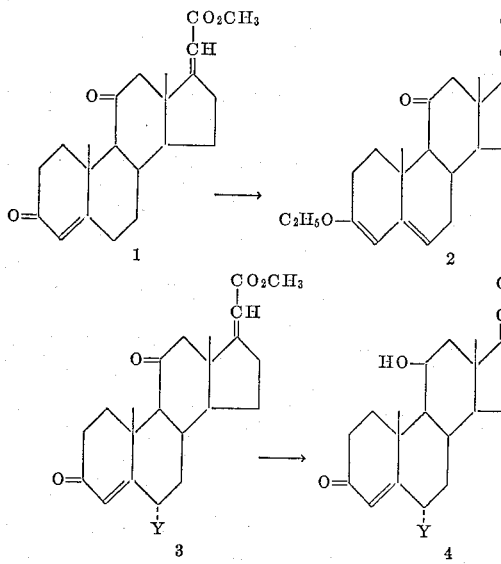

wherein Y is chlorine or fluorine.

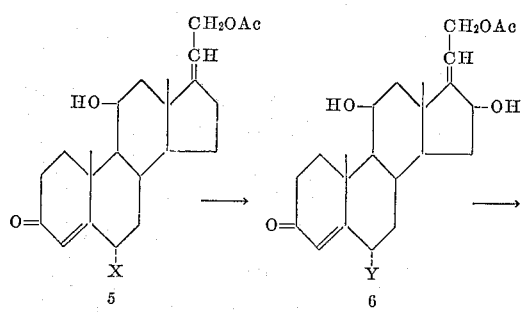

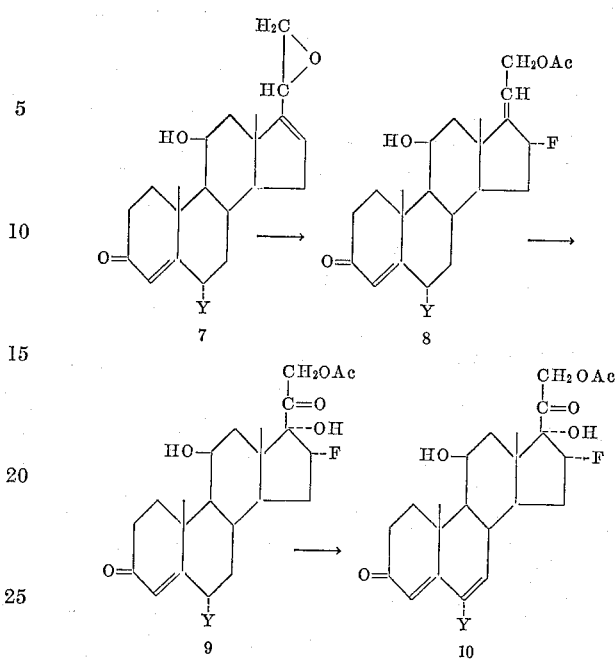

wherein Y is hydrogen, methyl, chlorine or fluorine.

FLOW SHEET B

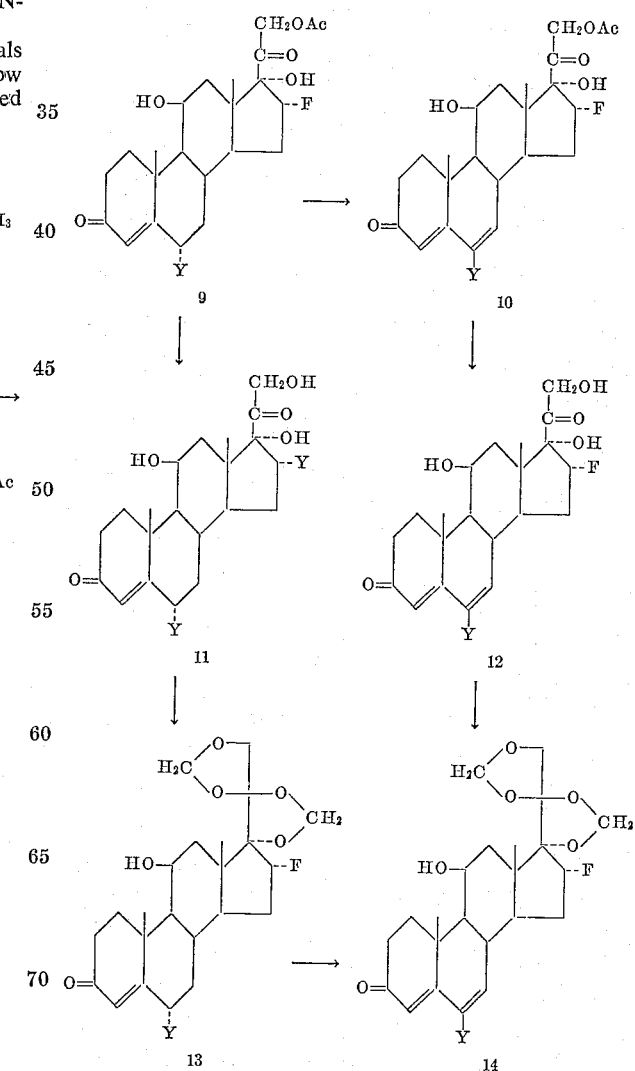

wherein Y is hydrogen, methyl, chlorine or fluorine.

13
FLOW SHEET C (COMPARE EXAMPLE 19)

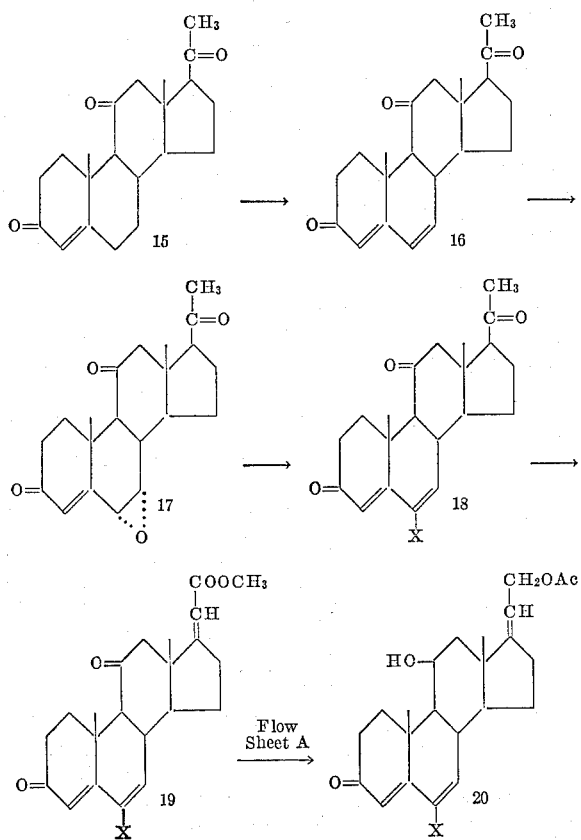

wherein Y is hydrogen, methyl, chlorine or fluorine.

FLOW SHEET D

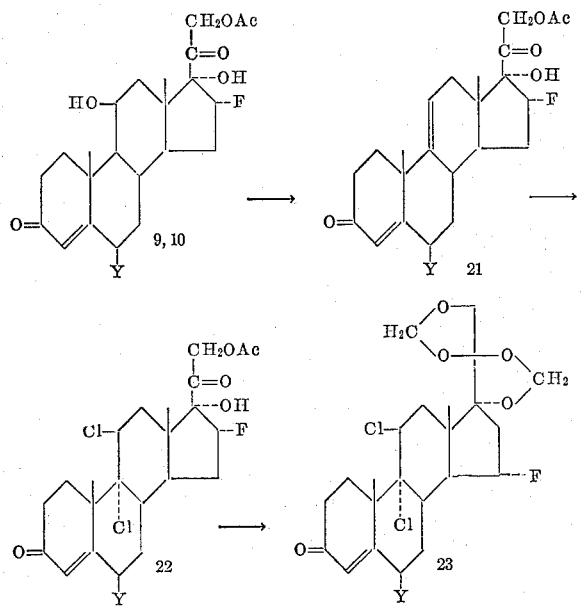

wherein Y is chlorine or fluorine.

The following examples illustrate methods of carrying out the present invention but it is to be understood that these examples are given for purposes of illustration and not of limitation.

Example 1

To a suspension of 25.0 g. of 16α-fluoro-11β,17α,21-trihydroxy-4-pregnene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid which is the 16α-fluoro - 17α,20,20,21 - bis(methylenedioxy) - 11β - hydroxy-4-pregnene-3-one.

The 17α,20,20,21-bis(methylenedioxy)-16α-fluoro-11β-hydroxy-4-pregnene-3-one (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature over night. The mixture is poured into an excess of saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21-bis(methylenedioxy)-16α-fluoro-11β-hydroxy-2-hydroxymethylene-4-pregnene-3-one.

The 17α,20,20,21-bis(methylenedioxy)-16α-fluoro-11β-hydroxy-2-hydroxymethylene-4-pregnene-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes then evaporated to dryness under reduced pressure. The residue is washed three times with cold water and the resulting amorphous solid is dried at 80° C. for 1 hour in high vacuum to give 17α,20,20,21-bis(methylenedioxy)-16α-fluoro-11β-hydroxy-4-pregneno-[3,2-c]pyrazole.

The 17α,20,20,21-bis(methylenedioxy)-16α-fluoro-11β-hydroxy-4-pregneno-[3,2-c]pyrazole (720 mg.) is heated in a steam bath with 24 ml. of a 60% aqueous solution of formic acid for about 30 minutes. The excess reagent is removed under vacuum using a water bath at about 50° C. as the source of heat. The residue is flushed four times with n-hexane and then dried at 60° C. in high vacuum to give a solid which is a mixture of 16α-fluoro-11β,17α,21 - trihydroxy - 20 - oxo - 4 - pregneno - [3,2-c]-pyrazole and 16α-fluoro-21-formyloxy-11β,17α-dihydroxy-20-oxo-4-pregneno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 16α-fluoro-11β,17α,21-trihydroxy-20-oxo-4-pregneno-[3,2-c]pyrazole.

To a solution of 100 mg. of 16α-fluoro-11β,17α,21-trihydroxy-20-oxo-4-pregneno-[3,2-c]pyrazole in 2 ml. of pyridine is added two milliequivalents of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford the N-acetyl-16α-fluoro-11β,17α, 21-trihydroxy-20-oxo-4-pregneno-[3,2-c]pyrazole 21-acetate which is isolated by addition of water and filtration.

In accordance with the above procedure, but starting with the 16α-fluoro-11β,17α,21-trihydroxy-20-oxo-4-pregneno-[3,2-c]pyrazole, and using two equivalents of another acylating agent there is obtained the corresponding N-acyl-21-acrylate thereof.

A solution of 5.73 g. of N-acetyl-16α-fluoro-11β,17α,21-trihydroxy -20-oxo-4-pregneno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords the 16α-fluoro-11β,17α,21-trihydroxy-20-oxo-4-pregneno-[3,2-c]pyrazole 21-acetate.

To a solution of 3.70 g. of 16α-fluoro-11β,17α,21-trihydroxy-20-oxo-4-pregneno-[3,2-c]pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamyl pyrazole in sufficient purity for the next step.

A 500 mg. aliquot of the above compound is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-16α-fluoro-11β,17α,21 - trihydroxy-20-oxo-4-pregneno-[3,2-c]-pyrazole.

To a solution of 85 mg. of N-carbamyl-16α-fluoro-11β, 17α,21-trihydroxy-20-oxo-4-pregneno-[3,2-c]pyrazole in 0.5 ml. of pyridine, cooled to 0° C. is added 0.015 ml. of methane sulfonyl chloride. The resulting mixture is allowed to stand at a temperature of approximately 0° C. for a period of approximately 1 hour. Water is then added to reaction mixture and the precipitate which forms is recovered by filtration, washed with water, and dried to give N-carbamyl-16α-fluoro-11β,17α,21-trihydroxy-20-oxo-4-pregneno-[3,2-c]pyrazole 21-mesylate.

To 180 mg. of N-carbamyl-16α-fluoro-11β,17α,21-trihydroxy-20-oxo-4-pregneno-[3,2-c]pyrazole 21-mesylate dissolved in 10 ml. of acetone is added 300 mg. of sodium iodine. The resulting mixture is heated at reflux temperature for a period of approximately 1 hour, and the reaction solution is cooled to room temperature and diluted with water. The material which precipitates is recovered by filtration, washed with water, and dried to give N-carbamyl-16αfluoro-11β,17α-dihydroxy-21-ido-20-oxo-4-pregneno-[3,2-c]pyrazole.

The N-carbamyl-16α-fluoro-11β,17α-dihydroxy-21-iodo-20-oxo-4-pregneno-[3,2-c]pyrazole is dissolved in a mixture of 5 ml. of water and 5 ml. of ethanol. To the resulting suspension is added 500 mg. of sodium bisufite and the mixture is heated under reflux for period of about one hour. The reaction solution is cooled, diluted with water, and the material which separates is recovered by filtration. The product is washed with water, dried and recrystallized from ethyl acetate to give N-carbamyl-16α-fluoro - 11β,17α - dihydroxy-20-oxo-pregneno-[3,2-c]pyrazole.

To a solution of 62 mg. of N-carbamyl-16α-fluoro-11β,17α,21 - trihydroxy - 20-oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl-17α,21-epoxy - 16α - fluoro - 11β - hydroxy-20-oxo-4-pregneno-[3,2-c]pyrazole and N-carbamyl-16α,21-difluoro-11β,17α-dihydroxy-20-oxo - 4 - pregneno - [3,2-c]pyrazole which compounds are separated by partition chromatography, or by chromatography on silica gel.

To a solution of 355 mg. of N-carbamyl-16α-fluoro-11β,17α-dihydroxy-20-oxo-4-pregneno-[3,2-c]pyrazole in 35 ml. of glacial acetic acid there is added slowly with stirring 104 mg. of sodium nitrate in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina affords 16α-fluoro-11β,17α-dihydroxy-20-oxo-4-pregneno-[3,2-c]pyrazole.

In accordance with the above procedure, but starting with the N-carbamyl-16α,21-difluoro-11β,17α-dihydroxy-20-oxo-4-pregneno-[3,2-c]pyrazole there is obtained the 16α,21 - difluoro - 11β,17α-dihydroxy-20-oxo-4-pregneno-[3,2-c]pyrazole.

*Example 2*

To a suspension of 25.0 g. of 6,16α-difluoro-11β,17α,21-trihydroxy-4,6-pregnadiene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid which is the 6,16α-difluoro-17α,20,21-bis (methylenedioxy)-11β-hydroxy-4,6-pregnadiene-3-one.

The 17α,20,20,21 - bis(methylenedioxy) - 6,16α - difluoro-11β - hydroxy - 4,6 - pregnadiene - 3 - one (3.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20, 20,21 - bis(methylenedioxy) - 6,16α - difluoro - 11β - hydroxy - 2 - hydroxymethylene - 4,6 - pregnadiene - 3-one.

The 17α,20,20,21 - bis(methylenedioxy) - 6,16α - difluoro - 11β - hydroxy - 2 - hydroxymethylene - 4,6 - pregnadiene-3-one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21 - bis(methylenedioxy) - 6,16α - difluoro - 11β-hydroxy-4,6-pregnadieno-[3,2-c]pyrazole.

The 17α,20,20,21 - bis(methylenedioxy) - 6,16α - difluoro - 11β - hydroxy - 4,6 - pregnadieno - [3,2-c]pyrazole (720 mg.) is heated in a steam bath with 24 ml. of a 60% aqueous solution of formic acid for about 30 minutes. The excess reagent is removed under vacuum using a water bath at about 50° C. as the source of heat. The residue is flushed four times with n-hexane and then dried at 60° C. in high vacuum to give a solid which is a mixture of 6,16α-difluoro-11β,17α,21-trihydroxy-20-oxo-4,6-pregnadieno - [3,2-c]pyrazole and 6,16α - difluoro - 21-formyloxy - 11β,17α - dihydroxy - 20 - oxo - 4,6 - pregnadieno-[3,2-c]pyrozole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 6,16α-difluoro - 11β,17α,21 - trihydroxy - 20 - oxo - 4,6 - pregnadieno-[3,2-c]pyrozole.

To a solution of 100 mg. of 6,16α-difluoro-11β,17α,21-trihydroxy - 20 - oxo - 4,6 - pregnadieno[3,2-c]pyrazole in 2 ml. of pyridine is added two milliequivalents of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1-3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford the N-acetyl - 6,16α - difluoro - 11β,17α,21 - trihydroxy - 20-oxo - 4,6 - pregnadieno - [3,2-c]pyrazole 21-acetate which is isolated by addition of water and filtration.

In accordance with the above procedure, but starting with the 6,16α-difluoro-11β,17α,21-trihydroxy-20-oxo-4,6-pregnadieno-[3,2-c]pyrazole, and using two equivalents of another acylating agent there is obtained the corresponding N-acyl-21-acylate thereof.

A solution of 5.73 g. of N-acetyl-6,16α-difluoro-11β,17α,21 - trihydroxy - 20 - oxo - 4,6 - pregnadieno-[3,2-c]-pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords the 6,16α-difluoro-17α,21-dihydroxy - 11,20 - dioxo - 4,6 - pregnadieno - [3,2-c]pyrazole 21-acetate.

To a solution of 3.70 g. of 6,16α-difluoro-11β,17α, 21-trihydroxy - 20 - oxo - 4,6- pregnadieno - [3,2-c]pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamyl-pyrazole in sufficient purity for the next step.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give N-carbamyl-6,16α-difluoro - 11β,17α,21 - trihydroxy - 20 - oxo - 4,6 - pregnadieno-[3,2-c]pyrazole.

To a solution of 85 mg. of N-carbamyl-6,16α-difluoro-11β,17α,21 - trihydroxy - 20 - oxo - 4,6 - pregnadieno-[3,2-c]pyrazole in 0.5 ml. of pyridine, cooled to 0° C. is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-carbamyl-6,16α-difluoro-11β,17α,21 - trihydroxy - 20 - xo - 4,6 - pregnadieno-[3,2c]pyrazole 21-mesylate.

To 180 mg. of N-carbamyl-6,16α-difluoro-11β,17α,21-trihydroxy - 20 - oxo - 4,6 - pregnadieno - [3,2 - c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl-6,16α-difluoro-11β,17α-dihydroxy - 21 - iodo - 20 - oxo - 4,6 - pregnadieno - [3,2-c]pyrazole.

The N-carbamyl-6,16α-difluoro-11β,17α-dihydroxy-21-iodo - 20 - oxo - 4,6 - pregnadieno - [3,2-c]pyrazole is dissolved in a mixture of 5 ml. of water and 5 ml. of ethanol. To the resulting suspension is added 500 mg. of sodium bisulfite and the mixture is heated under reflux for a period of about one hour. The reaction solution is cooled, diluted with water, and the material which separates is recovered by filtration. The product is washed with water, dried and recrystallized from ethyl acetate to give N-carbamyl - 6,16α - difluoro - 11β,17α - dihydroxy - 20 - oxo-4,6-pregnadieno-[3,2-c]pyrazole.

To a solution of 62 mg. of N-carbamyl-6,16α-difluoro-11β,17α,21 - trihydroxy - 20 - oxo - 4,6 - pregnadieno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of N-carbamyl - 17α,21 - epoxy - 6,16α - difluoro - 11β - hydroxy - 20 - oxo - 4,6 - pregnadieno - [3,2 - c]pyrazole and N-carbamyl-6,16α,21-trifluoro-11β,17α-dihydroxy - 20 - oxo - 4,6 - pregnadieno - [3,2 - c]pyrazole which compounds are separated by partition chromatography, or by chromatography on silical gel.

To a solution of 355 mg. of N-carbamyl-6,16α-difluoro-11β,17α - dihydroxy - 20 - oxo - 4,6 - pregnadieno - [3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina afford 6,16α-difluoro - 11β,17α - dihydroxy - 20 - oxo - 4,6 - pregnadieno - [3,2-c]pyrazole.

In accordance with the above procedure, but starting with the N-carbamyl-6,16α,21-trifluoro-11β,17α-dihydroxy - 20 - oxo - 4,6 - pregnadieno - [3,2 - c]pyrazole there is obtained the 6,16α,21-trifluoro-11β,17α-dihydroxy-20-oxo-4,6-pregnadieno-[3,2-c]pyrazole.

In accordance with the above procedures, but starting with the 16α-fluoro-11β,17α,21-trihydroxy-6-methyl-4,6-pregnadiene-3,20-dione in place of the 6,16α-difluoro-11β,17α,21-trihydroxy-4,6-pregnadiene-3,20-dione, there are obtained as products the corresponding 16α-fluoro-11β,17α,21 - trihydroxy - 6 - methyl - 20 - oxo - 4,6 - pregnadieno-[3,2-c]pyrazole and the N-acyl-, the 21-acylate, and the N-acyl 21-acylate derivatives thereof; the 16α-fluoro - 11β,17α - dihydroxy - 6 - methyl - 20 - oxo - 4,6-pregnadieno-[3,2-c]pyrazole and the N-acyl derivatives thereof; and the 16α,21-difluoro-11β,17α-dihydroxy-6-methyl-20-oxo-4,6-pregnadieno-[3,2-c]pyrazole and the N-acyl derivatives thereof.

*Example 3*

To a suspension of 10 g. of 9α,11β-dichloro-16α-fluoro-17α,21-dihydroxy-4-pregnene-3,20-dione in 475 ml. of alcohol-free chloroform and 300 ml. of methylene chloride, cooled to about 5° C. in an ice bath, is added with constant stirring 189 ml. of cold, concentrated hydrochloric acid and then 189 ml. of formalin (low in methanol). The mixture is removed from the ice bath and stirred at room temperature for 2 hours. The layers are separated and the aqueous phase is back-extracted twice with chloroform. The combined organic layers are washed with water, then with a 5% solution of sodium bicarbonate and again with water. The solution is dried over magnesium sulfate and evaporated to dryness under reduced pressure. The residue is flushed three times with methanol. Hot methanol is then added and the product is filtered and then crystallized from a mixture of methylene chloride and n-hexane to give 17α,20,20,21-bis(methylenedioxy)-9α,11β-dichloro-16α-fluoro-4-pregnene-3-one.

The 17α,20,20,21 - bis(methylenedioxy) - 9α,11β - dichloro-16α-fluoro-4-pregnene-3-one (500 mg.) is suspended in 8.5 cc. of dry benzene and treated with 0.15 ml. of freshly distilled ethyl formate. The air in the system is replaced with nitrogen and 225 mg. of sodium hydride (as a 58% dispersion in mineral oil is added). The system is again evacuated and filled with nitrogen. The mixture is stirred under nitrogen for ½ hour after which time 0.2 ml. of ethyl formate is added and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as a sodium salt by extraction into a 10% solution of sodium carbonate. The aqueous alkaline extracts are again acidified with an excess of a saturated aqueous solution of sodium dihydrogen phosphate and extracted into ether. The combined organic extracts are dried over sodium sulfate and evaporated to dryness to give 17α,20,20,21-bis-(methylenedioxy) - 9α,11β - dichloro - 16α - fluoro - 2 - hydroxymethylene-4-pregnene-3-one.

The 17α,20,20,21-bis(methylenedioxy)-9α,11β-dichloro-16α - fluoro - 2 - hydroxymethylene-4-pregnene-3-one (65 mg.) is dissolved in 0.7 ml. of absolute ethanol and treated with a solution of 0.12 ml. of hydrazine hydrate dissolved in 0.12 ml. of absolute ethanol. The mixture is refluxed in a nitrogen atmosphere for about 45 minutes and then evaporated to dryness under reduced pressure. The residue is dissolved in chloroform and petroleum ether is added to give a solid which is 17α,20,2021-bis(methylenedioxy) - 9α,11β - dichloro - 16α - fluoro-4-pregneno-[3,2-c]pyrazole.

The 17α,20,20,21-bis(methylenedioxy) - 9α,11β-dichloro-16α-fluoro-4-pregneno-[3,2-c]pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. Th residue is then dissolved in acetone and precipitated with n-hexane to give an amorphous solid which is a mixture of 9α,11β-dichloro-16α-fluoro - 17α,21 - dihydroxy-20-oxo-4-pregneno-[3,2-c]pyrazole and 9α,11β,-dichloro-16α-fluoro-21-formyloxy-17α-hydroxy-20-oxo-4-pregneno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α,11β-dichloro-16α-fluoro - 17α,21-dihydroxy-20-oxo-4-pregneno-[3,2-c]pyrazole.

To a solution of 100 mg. of 9α,11β-dichloro-16α-fluoro-17α,21 - dihydroxy - 20 - oxo - 4 - pregneno-[3,2-c]pyrazole in 2 ml. of pyridine is added two milliequivalents of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C., under vacuum. The product is then crystalized from a solvent; alternately, the product may be chromatographed on alumina to give the N-acetyl-9α,11β-dichloro - 16α - fluoro - 17α,21-dihydroxy-20-oxo-4-pregneno-[3,2-c]pyrazole 21-acetate, which is isolated by crystallization of the appropriate eluate.

In accordance with the above procedures, but starting with the 9α,11β-dichloro-16α-fluoro-17α,21-dihydroxy-20-oxo-4-pregneno-[3,2-c]pyrazole and using two equivalents of another acylating agent there is obtained the corresponding N-acyl-21-acylate thereof.

A solution of 5.73 g. of N-acetyl-9α,11β-dichloro-16α-fluoro - 17α,21-dihydroxy - 20 - oxo - 4-pregneno-[3,2-c]-pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 9α,11β-dichloro-16α-fluoro-17α,21-dihydroxy-20-oxo-4-pregneno-[3,2 - c]pyrazole 21-acetate.

To a solution of 3.70 g. of 9α,11β-dichloro-16α-fluoro-17α,21-dihydroxy-20-oxo-4-pregneno-[3,2-c]pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamyl pyrazole in sufficient purity for the next step.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give N-carbamyl-9α,11β-dichloro - 16α - fluoro - 17α,21-dihydroxy-20-oxo-4-pregneno-[3,2-c]pyrazole.

To a solution of 85 mg. of N-carbamyl-9α,11β-dichloro-16α - fluoro - 17α,21 - dihydroxy - 20 - oxo-4-pregneno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-carbamyl-9α,11β-dichloro-16α-fluoro-17α,21-dihydroxy-20-oxo-4-pregneno-[3,2-c]pyrazole 21-mesylate.

To 180 mg. of N-carbamyl-9α,11β-dichloro-16α-fluoro-17α,21-dihydroxy-20-oxo-4-pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl-9α,11β-dichloro-16α-fluoro-17α-hydroxy-21-iodo-20-oxo-4-pregneno-[3,2-c]pyrazole.

The N-carbamyl-9α,11β-dichloro-16α-fluoro-17α-hydroxy-21-iodo-20-oxo-4-pregneno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-carbamyl-9α,11β-dichloro-16α-fluoro-17α-hydroxy-20-oxo-4-pregneno-[3,2-c]pyrazole.

To a solution of 62 mg. of N-carbamyl-9α,11β-dichloro-16α-fluoro-17α,21-dihydroxy-20-oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is then added to the cooled solution and the product is extracted into chloroform, dried over sodium sulfate and evaporated to dryness. The resulting product is a mixture of N-carbamyl-9α,11β-dichloro-16α-fluoro-17α,21-epoxy-20-oxo-4-pregneno-[3,2-c]pyrazole and N-carbamyl-9α,11β-dichloro-16α,21-difluoro-17α-hydroxy-20-oxo-4-pregneno[3,2-c]pyrazole, which compounds are separated by partition chromatography or by chromotography on silica gel.

To a solution of 355 mg. of N-carbamyl-9α,11β-dichloro-16α-fluoro-17α-hydroxy-20-oxo-4-pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 9α,11β-dichloro-16α-fluoro-17α-hydroxy-20-oxo-4-pregneno-3,2-c]pyrazole.

In accordance with the above procedures, but starting with the N-carbamyl-9α,11β-dichloro-16α,21-difluoro-17α-hydroxy-20-oxo-4-pregneno-[3,2-c]pyrazole there is obtained the corresponding 9α,11β-dichloro-16α,21-difluoro-17α-hydroxy-20-oxo-4-pregneno-[3,2-c]pyrazole.

*Example 4*

To a suspension of 10 g. of 9α,11β-dichloro-16α-fluoro-17α,21-dihydroxy-6-methyl-4,6-pregnadiene-3,20-dione in 475 ml. of alcohol-free chloroform and 300 ml. of methylene chloride, cooled to about 5° C. in an ice bath, is added with constant stirring 189 ml. of cold, concentrated hydrochloric acid and then 189 ml. of formalin (low in methanol). The mixture is removed from the ice bath and stirred at room temperature for 2 hours. The layers are separated and the aqueous phase is back-extracted twice with chloroform. The combined organic layers are washed with water, then with a 5% solution of sodium bicarbonate and again with water. The solution is dried over magnesium sulfate and evaporated to dryness under reduced pressure. The residue is flushed three times with methanol. Hot methanol is then added and the product is filtered and then crystallized from a mixture of methylene chloride and n-hexane to give 17α,20,20,21-bis(methylenedioxy)-9α,11β-dichloro-16α-fluoro-6-methyl-4,6-pregnadiene-3-one.

The 17α,20,20,21-bis(methylenedioxy)-9α,11β-dichloro-16α-fluoro-6-methyl-4,6-pregnadiene-3-one (500 mg.) is suspended in 8.5 cc. of dry benzene and treated with 0.15 ml. of freshly distilled ethyl formate. The air in the system is replaced with nitrogen and 225 mg. of sodium hydride (as a 58% dispersion in mineral oil is added). The system is again evacuated and filled with nitrogen. The mixture is stirred under nitrogen for ½ hour after which time 0.2 ml. of ethyl formate is added and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as a sodium salt by extraction into a 10% solution of sodium carbonate. The aqueous alkaline extracts are again acidified with an excess of a saturated aqueous solution of sodium dihydrogen phosphate and extracted into ether. The combined organic extracts are dried over sodium sulfate and evaporated to dryness to give 17α,20,20,21-bis(methylenedioxy)-9α,11β-dichloro-16α-fluoro-2-hydroxymethylene-6-methyl-4,6-pregnadiene-3-one.

The 17α,20,20,21-bis(methylenedioxy)-9α,11β-dichloro-16α-fluoro-2-hydroxymethylene-6-methyl-4,6-pregnadiene-3-one (65 mg.) is dissolved in 0.7 ml. of absolute ethanol and treated with a solution of 0.12 ml. of hydrazine hydrate dissolved in 0.12 ml. of absolute ethanol. The mixture is refluxed in a nitrogen atmosphere for about 45 minutes and then evaporated to dryness under reduced pressure. The residue is dissolved in chloroform and petroleum ether is added to give a solid which is 17α,-20,20,21-bis-(methylenedioxy)-9α,11β-dichloro-16α-fluoro-16-methyl-4,6-pregnadieno-[3,2-c]pyrazole.

The 17α,20,20,21-bis(methylenedioxy)-9α,11β-dichloro-16α-fluoro-6-methyl-4,6-pregnadieno-[3,2-c]pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. The residue is then dissolved in acetone and precipitated with n-hexane to give an amorphous solid which is a mixture of 9α,11β-dichloro-16α-fluoro-17α,21-dihydroxy-6-methyl-20-oxo-4,6-pregnadieno-[3,2-c]pyrazole, and 9α,11β-dichloro-16α-fluoro-21-formyloxy-17α-hydroxy-6-methyl-20-oxo-4,6-pregnadieno-[3,2-c]pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered, and dried to constant weight to give 9α,11β-dichloro-16α-fluoro-17α,21-dihydroxy-6-methyl-20-oxo-4,6-pregnadieno-[3,2-c]pyrazole.

To a solution of 100 mg. of 9α,11β-dichloro-16α-fluoro-17α,21-dihydroxy-6-methyl-20-oxo-4,6-pregnadieno-[3,2-c]pyrazole in 2 ml. of pyridine is added two milliequivalents of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C., under vacuum. The product is then crystallized from a solvent; alternately, the product may be chromatographed on alumina to give the N-acetyl-9α,11β-dichloro-16α-fluoro-17α,21 - dihydroxy - 6 - methyl - 20 - oxo - 4,6 - pregnadieno-[3,2-c]pyrazole 21-acetate, which is isolated by crystallization of the appropriate eluate.

In accordance with the above procedures, but starting with the 9α,11β-dichloro-16α-fluoro-17α,21-dihydroxy-6-methyl-20-oxo-4,6-pregnadieno-[3,2-c]pyrazole and using two equivalents of another acylating agent there is obtained the corresponding N-acyl-21-acylate thereof.

A solution of 5.73 g. of N-acetyl-9α,11β-dichloro-16α-fluoro - 17α,21 - dihydroxy - 6 - methyl - 20 - oxo - 4,6-pregnadieno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 9α,11β-dichloro - 16α - fluoro - 17α,21 - dihydroxy - 6 - methyl-20-oxo-4,6-pregnadieno-[3,2-c]pyrazole 21-acetate.

To a solution of 3.70 g. of 9α,11β-dichloro-16α-fluoro-17α,21 - dihydroxy - 20 - oxo - 4,6 - pregnadieno - [3,2-c]-pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamyl-pyrazole in sufficient purity for the next step.

A 500 mg. aliquot of the above compound is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-9α,11β-dichloro - 16α - fluoro - 17α,21 - dihydroxy - 20 - oxo - 4,6-pregnadieno-[3,2-c]pyrazole.

To a solution of 85 mg. of N-carbamyl-9α,11β-dichloro - 16α - fluoro -17α,21 - dihydroxy - 6 - methyl - 20-oxo-4,6-pregnadieno-[3,2-c]pyrazole in 0.5 ml. of pyridine, cooled to 0° C., in added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-carbamyl - 9α,11β - dichloro - 16α - fluoro - 17α,21 - dihydroxy - 6 - methyl - 20 - oxo - 4,6 - pregnadieno - [3,2-c]-pyrazole 21-mesylate.

To 180 mg. of N - carbamyl - 9α,11β-dichloro-16α-fluoro - 17α,21 - dihydroxy - 6 - methyl - 20 - oxo - 4,6-pregnadieno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl - 9α,11β - dichloro - 16α - fluoro - 17α - hydroxy - 6 - methyl - 21 - iodo - 20 - oxo - 4,6 - pregnadieno-[3,2-c]pyrazole.

The N - carbamyl - 9α,11β-dichloro-16α-fluoro-17α-hydroxy - 21 - iodo - 6 - methyl - 20 - oxo - 4,6 - pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give N-carbamyl-9α,11β-dichloro-16α - fluoro - 17α - hydroxy - 6 - methyl - 20 - oxo - 4,6-pregnadieno-[3,2-c]pyrazole.

To a solution of 62 mg. of N-carbamyl-9α,11β-dichloro-16α - fluoro - 17α,21 - dihydroxy - 6 - methyl - 20 - oxo-4,6 - pregnadieno - [3,2 - c]pyrazole 21 - mesylate in 1 ml. of freshly distilled anhydrous dimethylformamide is added enough anhydrous potassium fluoride to assure a saturated solution. The mixture is heated at 110° C. for 20 hours. Water is then added to the cooled solution and the product is extracted into chloroform, dried over sodium sulfate and evaporated to dryness. The resulting product is a mixture of N-carbamyl-9α,11β-dichloro - 17α,21 - epoxy - 16α - fluoro - 6 - methyl - 20-oxo - 4,6 - pregnadieno - [3,2 - c]pyrazole and N - carbamyl - 9α,11β - dichloro - 16α,21 - difluoro - 17α - hydroxy - 6 - methyl - 20 - oxo - 4,6 - pregnadieno - [3,2-c]pyrazole, which compounds are separated by partition chromatography or by chromatography on silica gel.

To a solution of 355 mg. of N-carbamyl-9α,11β-dichloro - 16α - fluoro - 17α - hydroxy - 6 - methyl - 20-oxo-4,6-pregnadieno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina affords 9α,11β-dichloro-16α-fluoro-17α-hydroxy-6-methyl-20-oxo-4,6-pregnadieno-[3,2-c]pyrazole.

In accordance with the above procedure, but starting with the N-carbamyl-9α,11β-dichloro-16α,21-difluoro-17α-hydroxy - 6 methyl - 20 -oxo - 4,6 - pregnadieno - [3,2-c]pyrazole there is obtained 9α,11β-dichloro-16α,21-difluoro - 17α - hydroxy - 6 - methyl - 20 - oxo - 4,6 - pregnadieno-[3,2-c]pyrazole.

In accordance with all of the above procedures, but starting with the 9α,11β-dichloro-6,16α-difluoro-17α,21-dihydroxy - 4,6 - pregnadiene - 3,20 - dione in place of the 9α,11β - dichloro - 16α - fluoro - 17α,21 - dihydroxy-6-methyl-4,6-pregnadiene-3,20-dione there are obtained as products the corresponding 9α,11β-dichloro-6,16α-difluoro - 17α,21 - dihydroxy - 20 - oxo - 4,6 - pregnadieno-[3,2-c]pyrazole and the N-acyl-, the 21-acylate, and the N-acyl-21-acylate derivatives thereof in which the two acyl groups may be the same or different; the 9α,11β-dichloro - 6,16α - difluoro - 17α - hydroxy - 20 - oxo - 4,6-pregnadieno[3,2-c]pyrazole and the N-acyl derivative thereof; and the 9α,11β-dichloro-6,16α,21-trifluoro-17α-hydroxy-20-oxo-4,6-pregnadieno-[3,2-c]pyrazole and the N-acyl derivatives thereof.

*Example 5*

A 5 g. sample of 9α,16α-difluoro-11β,17α,21-trihydroxy-4,6-pregnadiene-3,20-dione is dissolved in a mixture of 235 ml. of chloroform and 150 ml. of methylene chloride, cooled in an ice bath with stirring and treated with 85 ml. of formaldehyde (27%). An equal volume (85 ml.) of cold concentrated hydrochloric acid is added from a funnel over a 5-minute interval with stirring and cooling. The mixture is stirred at room temperature for four hours. The layers are separated and the organic layer is washed free of acid by washing three times with water and then with a 5% solution of sodium bicarbonate. The organic layers are washed free of bicarbonate, dried over magnesium sulfate and taken to dryness. The gummy residue is treated with enough hot methanol on a steam bath to effect trituration, and the resulting crystalline solid is separated by filtering the mixture while hot. (The filtrate is set aside and may deposit additional product over night.) The crude product is dried to constant weight and purified by chromatography. The product is partially dissolved in 250 ml. of hot chloroform and diluted with an equal volume of hot benzene to complete solution. After cooling, the mixture is adsorbed in 100 g. of basic alumina and eluted with benzene and chloroform to give 17,20,20,21-bis(methylenedioxy) - 9α,16α - difluoro - 11β - hydroxy-4,6-pregnadiene-3-one.

The 17α,20,20,21 - bis(methylenedioxy) - 9α,16α - difluoro-11β-hydroxy-4,6-pregnadiene-3-one (3.25 g.) is dissolved in 76 ml. of dry pyridine and added to a cold solution prepared by the cautious addition of 3.25 g. of chromium trioxide (in portions) to 34.7 ml. of cold pyridine. The mixture is allowed to stand at room temperature over night. The mixture is poured into water and extracted three times with ethyl acetate, avoiding excessive shaking especially during the third extraction. The combined ethyl acetate extracts are washed three times with 1 N sulfuric acid and then with water until neutral. The combined ethyl acetate extracts are dried over magnesium sulfate and taken to dryness to give 2.94 g. of product. The product is dissolved in benzene, adsorbed on basic alumina and eluted with 8.2 benzene:chloroform to give 17α,20,20,21-bis (methylenedioxy)9-α,16α-difluoro-4,6-pregnadiene-3,11-dione.

A 2.60 g. sample of 17α,20,20,21-bis(methylenedioxy) - 9α,16α -difluoro - 4,6 - pregnadiene - 3,11 - dione is dissolved in 95 ml. of dry benzene using dry equipment and treated with 2.43 ml. of freshly distilled ethyl formate. About 1.19 g. of a dispersion of sodium hydride in mineral oil (about 51%) is added, followed by about 1.19 g. of freshly prepared dry sodium methoxide (dried at about 175° C. using an oil pump for 4 hours). The air in the system is again replaced with nitrogen and the mixture, which turns yellow at once, is stirred at room temperature for one and one half hours. At this point the color of the reaction mixture is a dark orange. The mixture is chilled in an ice bath and a cold, saturated solution of sodium dihydrogen phosphate is added gradually to decompose excess sodium hydride and neutralize the sodium methoxide. Ether is added and the layers are separated. The aqueous layers are back-extracted with ether and the combined organic layers are washed free of acid with water and then extracted three to four times with a 5% aqueous solution of sodium bicarbonate. These extracts are set aside. The product is now extracted four to five times with a cold 2% aqueous solution of sodium hydroxide. (In order to avoid emulsification, the aqueous alkali is gently poured into the separatory funnel and the layers are separated without shaking the funnel. The last two extracts may be shaken with care.) The dark liquor is back-extracted two times with ether, and finally acidified in the cold with saturated aqueous solution of sodium dihydrogen phosphate. The neutral ether-benzene fraction should be set aside and processed as described below. The product is extracted into ether, and the ether extracts are washed free of acid with a saturated solution of sodium chloride. After drying over magnesium sulfate, the ether solution is taken to dryness and the amorphous product is crystallized from methanol to give 17α,20,20,21-bis(methylenedioxy)-9α,16α - difluoro - 2 - hydroxymethylene - 4,6 - pregnadiene-3,11-dione. This material is satisfactory for use in the next step.

A 1.00 g. aliquot of 17α,20,20,21-bis(methylenedioxy)-9α,16α - difluoro - 2 - hydroxymethylene - 4,6 - pregnadiene-3,11-dione is suspended in 44 ml. of absolute ethanol and treated with 0.38 ml. of hydrazine hydrate (99–100%). The air in the system is replaced with nitrogen and the mixture is quickly brought to the reflux temperature. After refluxing for one hour the mixture is taken to dryness; the residual oil is treated with water and the resulting amorphous solid is removed by filtration, washed thoroughly with water and dried. The yield is about 900 mg. The crude product is dissolved in absolute ethanol and concentrated under vacuum until the solid separates. The solid is redissolved by heating, and then allowed to crystallize slowly to afford 17α,20,20,21-bis(methylenedioxy) - 9α - fluoro - 16α - methyl - 11 - oxo - 4,6 - pregnadieno-[3,2-c]pyrazole.

A 455 mg. aliquot of 17α,20,20,21-bis(methylenedioxy) - 9α,16α - difluoro - 11 - oxo - 4,6 - pregnadieno-[3,2-c]pyrazole is suspended in 75 ml. of a solution of sodium borohydride in isopropanol which is prepared by suspending an excess of sodium borohydride in isopropanol, stirring vigorously for about 15 minutes, and filtering to separate the excess of sodium borohydride. To the suspension is added an 0.816 ml. aliquot of a solution of 0.55 ml. of triethylamine in 1.45 ml. of isopropanol. The mixture is stirred, and enough methylene chloride (about 30 ml.) is added, with cooling, to make the system homogeneous. One drop of water (ca. 1/20 ml.) is added and the mixture is stirred in a nitrogen atmosphere at room temperature over night. Insolubles generally separate out in the course of the reaction. The mixture is then cooled, and the excess of sodium borohydride is decomposed by the addition of cold 2.5 N hydrochloric acid. The mixture (pH ca. 5) is taken to dryness under vacuum and the residue is washed with water and dried to give 17α,20,20,21-bis(methylenedioxy) - 9α,16α - difluoro - 11β - hydroxy - 4,6 - pregnadieno-[3,2-c]pyrazole.

The 17α,20,20,21-bis(methylenedioxy)-9α,16α-difluoro-11β - hydroxy - 4,6 - pregnadieno - [3,2 - c]pyrazole (25 mg.) is heated on a steam bath with 5 cc. of a 60% aqueous solution of formic acid for about 30 minutes. The excess reagent is removed under reduced pressure using a water bath at about 50° C. as the source of heat. The residue is flushed with n-hexane. The residue is then dissolved in acetone and precipitated with n-hexane to give an amorphous solid which is a mixture of 9α,16α-difluoro-11β,17α,21 - trihydroxy - 20 - oxo - 4,6 -pregnadieno-[3,2-c]pyrazole and 9α,16α-difluoro-21-formyloxy-11β, 17α - dihydroxy - 20 - oxo - 4,6 - pregnadieno - [3,2-c] pyrazole, which compounds are separated by chromatography.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 9α,16α-difluoro - 11β,17α,21 - trihydroxy - 20 - oxo - 4,6 - pregnadieno-[3,2-c]pyrazole.

To a solution of 100 mg. of 9α,16α-difluoro-11β,17α,21-trihydroxy-20-oxo-4,6-pregnadieno-[3,2-c]pyrazole in 2 ml. of pyridine is added two milliequivalents of acetic anhydride. The mixtures is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N-acetyl-9α,16α-difluoro-11β,17α, 21-trihydroxy - 20 - oxo - 4,6 - pregnadieno - [3,2 - c] pyrazole 21-acetate is then isolated by addition of water and filtration.

In accordance with the above procedure, but starting with the 9α,16α-difluoro - 11β,17α,21 - trihydroxy - 20-oxo-4,6-pregnadieno-[3,2-c]pyrazole and using two milliequivalents of another acylating agent, there is obtained the corresponding N-acyl-21-acylate thereof.

A solution of 5.73 g. of N-acyl-9α,16α-difluoro-11β, 17α,21-trihydroxy - 20 - oxo - 4,6-pregnadieno-[3,2-c]-pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting products affords 9α,16α-difluoro-11β,17α,21-trihydroxy - 20 - oxo-4,6-pregnadieno-[3,2-c]pyrazole 21-acetate.

To a solution of 3.70 g. of 9α,16α-difluoro-11β,17α,21-trihydroxy - 20 - oxo-4,6-pregnadieno-[3,2-c]pyrazole 21-acetate in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamyl-pyrazole in sufficient purity for next step.

A 500 mg. aliquot of the above compound is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-9α,16α-difluoro - 11β,17α,21 - trihydroxy - 20 - oxo-4,6-pregnadieno-[3,2-c]pyrazole.

To a solution of 85 mg. of N-carbamyl-9α,16α-difluoro-11β,17α,21-trihydroxy - 20 - oxo - 4,6 - pregnadieno-[3,2-c]pyrazole 21-acetate in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give N-carbamyl-9α,16α-difluoro-11β,17α,21-trihydroxy - 20-oxo-4,6-pregnadieno-[3,2-c]pyrazole 21-mesylate.

To 180 mg. of N-carbamyl-9α,16α-difluoro - 11β,17α, 21-trihydroxy - 20 - oxo-4,6-pregnadieno-[3,2-c]pyrazole 21-mesylate dissolved in 10 ml. of acetone is added 300 mg. of sodium iodide. The resulting mixture is heated at reflux temperature for a period of approximately one hour, and the reaction solution is cooled to room temperature and diluted with water. The material which precipitates is recovered by filtration, washed with water, and dried to give N-carbamyl-9α,16α-difluoro-11β,17α-dihydroxy-21-iodo - 20 - oxo-4,6-pregnadieno-[3,2-c]pyrazole.

The N-carbamyl-9α,16α-difluoro-11β,17α-dihydroxy-21-iodo-20-oxo-4,6-pregnadieno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hr. The reaction solution is cooled, diluted with water, the material which separates is recovered by filtration. The product is washed with water, dried and recrystallized from ethyl acetate to give N-carbamyl-9α, 16α-difluoro - 11β,17α-dihydroxy - 20 - oxo-4,6-pregnadieno-[3,2-c]pyrazole.

To a solution of 62 mg. of N-carbamyl-9α,16α-difluoro - 11β,17α,21-trihydroxy - 20 - oxo-4,6-pregnadieno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate, and evaporated to dryness. The resulting product is a mixture of N-carbamyl - 17α,21 - epoxy - 9α,16α - difluoro-11β-hydroxy - 20 - oxo-4,6-pregnadieno-[3,2-c]pyrazole and N-carbamyl-9α,21-difluoro - 11β,17α - dihydroxy - 16α - methyl - 20 - oxo-4,6-pregnadiene-[3,2-c]pyrazole, which compounds are separated by partition chromatography, or by chromatography on silica gel.

To a solution of 355 mg. of N-carbamyl - 9α,16α - difluoro - 11β,17α - dihydroxy - 20 - oxo-4,6-pregnadieno-[3,2-c]pyrazole in 35 ml. of glacial acetic acid there is added slowly with stirring 104 mg. of sodium nitrite in 5 ml. of water. After fifteen minutes at room temperature most of the acetic acid is removed at room temperature on the rotating evaporator. Ethyl acetate is added and this solution is extracted several times with sodium bicarbonate and then dried. Removal of the solvent, followed by chromatography on alumina affords 9α,16α-difluoro - 11β,17α - dihydroxy - 20 - oxo-4,6-pregnadieno-[3,2-c]pyrazole.

In accordance with the above procedure, but starting with the N-carbamyl - 9α,16α,21 - trifluoro-11β,17α-dihydroxy-20-oxo - 4,6 - pregnadieno-[3,2-c]pyrazole there is obtained the 9α,16α,21-trifluoro-11β,17α-dihydroxy-20-oxo-4,6-pregnadieno-[3,2-c]pyrazole.

The N-carbamyl-9α,16α-difluoro - 11β,17α - dihydroxy-20-oxo - 4,6 - pregnadieno-[3,2-c]pyrazole 21-dihydrogen phosphate, and the mono- and dialkali metal salts thereof, are prepared from the N-carbamyl-9α,16α-difluoro-11β,17α-dihydroxy - 21-iodo-20-oxo-4,6-pregnadieno-[3,2-c]pyrazole following the detailed procedure in column 32, lines 10–46; the N-carbamyl-group is then removed by the above procedure.

*Example 6*

To a solution of 0.5 millimole of 17α,20,20,21-bis(methylenedioxy) - 16α - fluoro - 11β - hydroxy-2-hydroxymethylene - 4 - pregnene - 3 - one (Example 4) in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the 17α,20,20,21-bis(methylenedioxy) - 16α - fluoro-N-methyl - 11β - hydroxy-4-pregneno-[3,2-c]pyrazole which is formed as the major component is removed by filtration.

Alternately, a mixture of 1'-methyl-, and 2'-methyl-17α,20,20,21-bis(methylenedioxy) - 16α - fluoro - 11β-hydroxy - 4 - pregneno-[3,2-c]pyrazole is prepared by heating 17α,20,20,21-bis(methylenedioxy) - 16α - fluoro-11β-hydroxy - 2 - hydroxymethylene - 4 - pregnene-3-one with methanol in the presence of p-toluene-sulfonic acid to form the 17α,20,20,21-bis(methylenedioxy) - 16α - fluoro-11β-hydroxy - 2 - methoxymethylene - 4 - pregnene-3-one, and then reacting the latter compound with methylhydrazine, following the detailed procedures given in column 31, lines 4–23, but using methylhydrazine instead of phenylhydrazine in the second step of the reaction. The components of the mixture are separated by chromatography.

In accordance with all the above procedures, but using other alkyl substituted hydrazines such as ethyl-, β-hydroxyethyl-, propyl-, butylhydrazines, and the like, in place of methylhydrazine, there are obtained the corresponding 1'-alkyl- and 2'-alkyl-17α,20,20,21-bis(methylenedioxy) - 16α - fluoro-11β-hydroxy-4-pregneno-[3,2-c] pyrazoles.

The 17α,20,20,21-bis(methylenedioxy) - 16α-fluoro-N-methyl - 11β - hydroxy - 4 - pregneno-[3,2-c]pyrazoles may be prepared by the following procedure:

The 17α,20,20,21-bis(methylenedioxy) - 16α - fluoro-11β-hydroxy - 2 - hydroxymethylene - 4 - pregnene-3-one is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for one hour in high vacuum to give 17α,20,20,21-bis(methylenedioxy)-16α-fluoro - 11β - hydroxy-4-pregneno-[3,2-c]pyrazole.

A solution of about 0.47 millimole of 17α,20,20,21-bis-(methylenedioxy)-16α-fluoro - 11β - hydroxy-4-pregneno-[3,2-c]pyrazole in 10 ml. of benzene is treated with about 30–38 mg. of about 51% sodium hydride (in oil suspension). After the addition of 2–3 ml. of dimethylformamide (dried over calcium hydride) and 5 ml. of methyl iodide, the mixture is stirred at room temperature over night. The product is filtered, washed with methylene chloride, and the filtrate and washings are taken to dryness. The residue is treated with water and the product is filtered to afford as a major component the 17α,20,20,21-bis(methylenedioxy)-16α-fluoro - 11β - hydroxy-N-methyl-4-pregneno-[3,2-c]pyrazole.

In accordance with the above procedure, but using another alkylating agent, for example, ethyl iodide, propyl iodide and the like, in place of the methyl iodide, there is obtained the corresponding N-alkyl - 17α,20,20,21 - bis(methylenedioxy) - 16α - fluoro - 11β - hydroxy-4-pregneno-[3,2-c]pyrazole.

The 17α,20,20,21-bis(methylenedioxy)-16α-fluoro-11β-hydroxy - 2' - methyl - 4 - pregneno-[3,2-c]pyrazole (15 mg.) is heated on a steam bath with 1 ml. of 60% formic acid for about 20 minutes and then filtered hot. The filtrate is taken to dryness, water is added, and a mixture of the 16α-fluoro - 11β,17α,21 - trihydroxy-2'-methyl-20-oxo-4-pregneno-[3,2-c]pyrazole and its 21-formate is recovered by filtration. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 16α - fluoro - 11β,17α,21 - trihydroxy-2'-methyl-20-oxo-4-pregneno-[3,2-c]pyrazole.

To a solution of 100 mg. of 16α-fluoro-11β,17α,21-trihydroxy - 2' - methyl - 20 - oxo - 4 - pregneno-[3,2-c]pyrazole in 2 ml. of pyridine is added one milliequivalent of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The 16α-fluoro-11β,17α,21-trihydroxy - 2' - methyl-20-oxo-4-pregneno-[3,2-c]pyrazole 21-acetate is then isolated by addition of water and filtration.

In accordance with the above procedure, but using an equivalent quantity of another acylating agent in place of acetic anhydride, there is obtained the corresponding 16α-fluoro - 11β,17α,21 - trihydroxy - 2' - methyl-20-oxo-4-pregneno-[3,2-c]pyrazole 21-acylate.

To a solution of 85 mg. of 16α-fluoro - 11β,17α,21-trihydroxy 2' - methyl - 20 - oxo-4-pregneno-[3,2-c]pyrazole in 0.5 ml. of pyridine, cooled to 0° C., is added 0.015 ml. of methane sulfonyl chloride. The resulting mixture is allowed to stand at a temperature of approximately 0° C. for a period of approximately 1 hour. Water is then added to the reaction mixture and the precipitate which forms is recovered by filtration, washed with water, and dried to give 16α-fluoro - 11β,17α,21 - trihydroxy-2'-methyl - 20 - oxo - 4 - pregneno-[3,2-c]pyrazole 21-mesylate.

To 180 mg. of 16α-fluoro - 11β,17α,21 - trihydroxy-2'-methyl - 20 - oxo - 4 - pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give 16α - fluoro - 11β,17α - dihydroxy-21-iodo-2'-methyl-20-oxo-4-pregneno-[3,2-c]pyrazole.

The 16α-fluoro-11β,17α-dihydroxy - 21 - iodo-2'-methyl-20-oxo-4-pregneno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the material which separates is recovered by filtration. The product is washed with water, dried and recrystallized from ethyl acetate to give 16α-fluoro-11β,17α-dihydroxy-2'-methyl-20-oxo-4 - pregneno - [3,2-c] pyrazole.

To a solution of 62 mg. of 16α-fluoro-11β,17α,21-trihydroxy-2'-methyl-20-oxo-4-pregneno - [3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy-16α-fluoro-11β-hydroxy-2'-methyl-20 - oxo - 4-pregneno-[3,2-c]pyrazole and 16α,21 - difluoro - 11β,17α - dihydroxy-2',16α - dimethyl - 20 - oxo-4 - pregneno - [3,2-c]pyrazole, which compounds are separated by partition chromatography, or by chromatography on silica gel.

In accordance with the above procedures beginning with the 2'-methyl - 17α,20,20,21 - bis(methylenedioxy)-16α-fluoro-11β-hydroxy-4-pregneno - [3,2-c]pyrazole, but using the 1'-methyl-derivative in place of the 2'-methyl-derivative, there are obtained the corresponding 1'-methyl compounds.

In accordance with all of the above procedures, but starting with the 17α,20,20,21-bis(methylenedioxy)-16α-fluoro-2-hydroxymethylene-4-pregnene-derivative which is obtained from each of the starting materials which are defined by the Formula 3 there are obtained the corresponding 1'-methyl- and 2'-methyl derivative.

*Example 7*

A mixture of 90 mg. of 17α,20,20,21-bis(methylenedioxy)-16α-fluoro-11β-hydroxy - 2 - hydroxymethylene - 4-pregnene-3-one and 0.028 ml. of phenylhydrazine are refluxed under nitrogen in 1.2 ml. of absolute ethanol for 50 minutes. The reaction mixture is taken to dryness. Water is added and the product is filtered to give an amorphous solid, which is washed successively with water, dilute acid, water, and petroleum ether. The product is crystallized from methanol to give 17α,20,20,21-bis(methylenedioxy)-16α-fluoro-11β-hydroxy - 2'-phenyl - 4 - pregneno-[3,2-c]pyrazole.

Alternately, a mixture of the 1'-phenyl and 2'-phenyl-17α,20,20,21-bis(methylenedioxy) - 16α - fluoro - 11β - hydroxy - 4 - pregneno - [3,2-c]pyrazole is prepared by the following route: A mixture of 1 gram of 17α,20,20,21-bis(methylenedioxy) 16α-fluoro-11β-hydroxy - 2 - hydroxymethylene-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 17α,20,20,21-bis(methylenedioxy) - 16α - fluoro-11β-hydroxy-2-methoxymethylene - 4 - pregnene - 3 - one is obtained by direct crystallization or by chromatography on acid-washed alumina and elution with ether:chloroform mixtures.

A mixture of 500 mg. of 17α,20,20,21-bis(methylenedioxy)-16α-fluoro-11β-hydroxy-2 - methoxymethylene - 4-pregnene-3-one, 100 ml. of ethanol, and 1 ml. of phenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benzene and ethylene acetate affords the 17α,20,20,21 - bis(methylenedioxy) - 16α - fluoro - 11β-hydroxy-1'-phenyl-4-pregneno-[3,2-c]pyrazole. Further elution with a mixture of 1:1 ether:petroleum ether and crystallization from benzene, affords the 17α,20,20,21-bis (methylenedioxy)-16α-fluoro - 11β - hydroxy - 2' - phenyl-4-pregneno-[3,2-c]pyrazole.

A 30 mg. aliquot of 17α,20,20,21-bis(methylenedioxy)-16α-fluoro-11β-hydroxy-2'-phenyl - 4 - pregneno - [3,2-c] pyrazole is heated on a steam bath with 2 ml. of 60% formic acid for 35 minutes. The solvents are removed under vacuum, water is added and the product is filtered off to give a mixture of 16α-fluoro-11β,17α,21-trihydroxy-20-oxo - 2'-phenyl - 4 - pregneno - [3,2-c]pyrazole and its 21-formate. The presence of formate is indicated by infrared absorption at 5.81 and 8.5μ.

A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for 10 minutes. The alkoxide is neutralized with acetic acid and the mixture is then taken to dryness and flushed with n-hexane. The residue is washed with water, filtered and dried to constant weight to give 16α-fluoro-11β,17α,21-trihydroxy-20 - oxo - 2'- phenyl - 4 - pregneno-[3,2-c]pyrazole.

The 16α - fluoro - 11β,17α,21-trihydroxy-20-oxo-2'-phenyl-4-pregneno-[3,2-c]pyrazole is treated with a mixture of 1.5 ml. of pyridine and 1.5 ml. of acetic anhydride and the mixture is allowed to stand at room temperature over night. The solvents are removed under vacuum, water is added and the 16α-fluoro-11β,17α,21-trihydroxy-20-oxo-2'-phenyl-4-pregneno-[3,2-c] pyrazole 21-acetate is removed by filtration. After drying, the compound is dissolved in methylene chloride, a few drops of 2.5 N HCl are added and the mixture is taken to dryness. The resulting 16α-fluoro-11β,17α,21-trihydroxy-20 - oxo-2'-phenyl-4-pregneno-[3,2-c]pyrazole 21-acetate hydrochloride salt is soluble in methylene chloride and can be crystallized from acetone.

The 16α - fluoro - 11β,17α,21-trihydroxy-20-oxo-2'-phenyl-4-pregneno-[3,2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the 16α-fluoro-11β,17α,21-trihydroxy - 20 - oxo - 2' - phenyl-4-pregneno-[3,2-c]pyrazole 21-mesylate.

The 16α - fluoro - 11β,17α,21-trihydroxy-20-oxo-2'-phenyl-4-pregneno-[3,2-c]pyrazole 21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 16α - fluoro - 11β,17α - dihydroxy-21-iodo-20-oxo-2'-phenyl-4-pregneno-[3,2-c]pyrazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silica gel. The 16α-fluoro-11β,17α-dihydroxy-20-oxo-2'-phenyl-4-pregneno-[3,2-c]pyrazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 16α-fluoro-11β,17α-dihydroxy-21-iodo-20-oxo-2'-phenyl-4-pregneno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give 16α-fluoro - 11β,17α - dihydroxy-20-oxo-2'-phenyl-4-pregneno-[3,2-c]pyrazole 21-dihydrogen phosphate.

The mono- and the dialkali-metal salts of the 21-dihydrogen phosphate compound are obtained by neutralizing the 21-dihydrogen phosphate ester with an alkali metal methoxide.

To a solution of 62 mg. of 16α-fluoro-11β,17α,21-trihydroxy-20-oxo-2'-phenyl-4-pregneno-[3,2 - c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 17α,21-epoxy-16α-fluoro-11β-hydroxy - 20 - oxo - 2'-phenyl-4-pregneno-[3,2-c]pyrazole and 16α,21-difluoro-11β,17α-dihydroxy-20-oxo-2'-phenyl-4-pregneno-[3,2-c]pyrazole, which compounds are separated by partition chromatography, or by chromatography on silica gel.

In accordance with the above procedures beginning with the 2'-phenyl-17α,20,20,21-bis(methylenedioxy)-16α-fluoro-11β-hydroxy-4-pregneno-[3,2-c]pyrazole, but using the 1'-phenyl-derivatives in place of the 2'-phenyl-derivatives, there are obtained the corresponding 1'-phenyl-compounds.

In accordance with all of the above procedures, but starting with the 17α,20,20,21-bis(methylenedioxy)-16α-fluoro-2-hydroxymethylene-4-pregnene derivative which is obtained from each of the starting materials which are defined by the formula in columns 30–31, lines 61 and 63, there are obtained the corresponding 1'-phenyl- and 2'-phenyl-derivatives.

Example 8

A 111.5 mg. sample of 17α,20,20,21-bis(methylenedioxy) - 16α - fluoro 11β - hydroxy-2-hydroxymethylene-4-pregnene-3-one is suspended in 2.5 ml. of ethanol and treated with 24.5 mg. of sodium acetate, following with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum to give a residue which has as its major component the 17α,20,20,21 - bis(methylenedioxy)-16α-fluoro-2'-(p-fluorophenyl) - 11β-hydroxy-4-pregneno[3,2-]pyrazole. The latter compound is recovered by dissolving the reaction mixture in methanol and then recrystallizing.

Alternately, a mixture of the 1'-(p-fluorophenyl)- and the 2' - (p - fluorophenyl)-17α,20,20,21-bis(methylenedioxy) - 16α-fluoro-11β-hydroxy-4-pregneno[3,2-c]pyrazole is prepared by the following route: A mixture of 1 gram of 17α,20,20,21-bis-(methylenedioxy)-16α-fluoro-11β-hydroxy-2-hydroxymethylene-4-pregnene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 17α,20,20,21-bis(methylenedioxy)-16α-fluoro-11β-hydroxy-2-methoxymethylene-4-pregnene-3-one is obtained by direct crystallization or by chromatography on acid-washed alumina and elution with ether:chloroform mixtures.

A mixture of 500 mg. of 17α,20,20,21-bis-(methylenedioxy) - 16α-fluoro-11β-hydroxy-16-methyl-2-methoxymethylene-4-pregnene-3-one, 100 ml. of ethanol, and 1 ml. of p-fluorophenylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene affords a product which on recrystallization from a mixture of benezne and ethyl acetate affords the 17α,20,20,21-bis(methylenedioxy)-16α-fluoro-1' - fluorophenyl-11β-hydroxy-4-pregneno[3,2-c]pyrazole. Further elution with a mixture of 1:1 ether:petroleum ether, and crystallization from benzene, affords the 17a,20,20,21 - bis(methylenedioxy)-16α-fluoro-2'-(p-fluorophenyl)-4-pregneno-[3,2-c]pyrazole.

A 70 mg. aliquot of 17α,20,20,21-bis(methylenedioxy)-16α - fluoro-2'-(p-fluorophenyl)-11β-hydroxy-4-pregneno-[3,2-c]pyrazole is heated on a steam bath with 2 ml. of a 60% solution of formic acid for 35 minutes. The excess reagent is removed under vacuum using a water bath at about 50° C. The residue is thoroughly washed with water and then dried at 80° C. to give 61.1 mg. of residue. The crude product is dissolved in 3 ml. of spectral grade methanol and allowed to react with 0.5 ml. of a 0.1 N solution of sodium methoxide in methanol at room temperature for 10 minutes. The product is neutralized with acetic acid. The mixture is then taken to dryness and washed thoroughly with water, filtered and dried to constant weight to give 11β-17α,21-trihydroxy-16α-fluoro-2'-(p-fluorophenyl)-20-oxo-4-pregneno-[3,2-c]pyrazole.

To a solution of 100 mg. of 16α-fluoro-2'-(p-fluorophenyl) - 11β-,17α,21-trihydroxy-20-oxo-4-pregneno-[3,2-c]pyrazole in 2 ml. of pyridine is added one milliequivalent of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum to afford 16α-fluoro-11β,17α, 21 - trihydroxy-2'-(p-fluorophenyl)-20-oxo-4-pregneno-[3, 2-c]pyrazole 21-acetate which is isolated by the addition of water and filtration. After drying, the compound is dissolved in methylene chloride, a few drops of 2.5 N HCl are added and the mixture is taken to dryness. The resulting hydrochloride salt is crystallized from acetone.

The 21-dihydrogen phosphate esters and the mono- and dialkali metal salts thereof are prepared by the procedure given in detail in column 32, lines 10–46 for the corresponding 2'-phenyl-steroid.

In accordance with the above procedure, but using an equivalent quantity of another acylating agent in place of acetic anhydride, there is obtained the corresponding 21-acylate.

To a solution of 85 mg. of 2'-(p-fluorophenyl)-16α-fluoro-11β,17α,21 - trihydroxy-20-oxo-4-pregneno-[3,2-c] pyrazole in 0.5 ml. of pyridine, cooled to 0° C. is added 0.015 ml. of methanesulfonyl chloride. The resulting mixture is allowed to stand at a temperature of approximately 0° C. for a period of approximately 1 hour. Water is then added to the reaction mixture and the crystalline precipitate which forms is recovered by filtration, washed with water, and dried to give 16α-fluoro-2'-(p-fluorophenyl)-11β,17α,21 - trihydroxy-20-oxo-4-pregneno-[3,2-c]pyrazole 21-mesylate.

To 180 mg. of 16α-fluoro-2'-(p-fluorophenyl)-11β,17α, 21-trihydroxy-20-oxo - 4 - pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The crystalline material which precipitates is recovered by filtration, washed with water, and dried to give 16α-fluoro-2'-(p-fluorophenyl)-11β,17α-dihydroxy-21-iodo-20-oxo-4-pregneno-[3,2-c]pyrazole.

The 16α-fluoro-2'-(p-fluorophenyl)-11β,17α-dihydroxy-21-iodo-20-oxo-4-pregneno-[3,2-c]pyrazole is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and the crystalline material which separates is recovered by filtration. The product is washed with water, dried and recrystallized from ethyl acetate to give 16α-fluoro-2'-(p-fluorophenyl)-11β,17α - dihydroxy - 20-oxo-4-pregneno-[3,2-c]pyrazole.

To a solution of 62 mg. of 16α-fluoro-2'-(p-fluorophenyl)-11β,17α,21-trihydroxy-20-oxo-4 - pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness. The resulting product is a mixture of 2' - p-fluorophenyl)-17α,21-epoxy - 16α - fluoro-11β-hydroxy-20-oxo-4-pregneno - [3,2-c]pyrazole and 2'-(p-fluorophenyl)-16α,21-difluoro-11β,17α-dihydroxy-20 - oxo-4-pregneno-[3,2-c]pyrazole which compounds are separated by partition chromatography.

In accordance with the above procedures beginning with the 16α-fluoro-2'-(p-fluorophenyl)-17α,20,20,21-bis (methylenedioxy)-11β - hydroxy-4-pregneno-[3,2-c]pyrazole, but using the 1'-(p-fluorophenyl)-derivative in place of the 2'-(p-fluorophenyl)-derivative, there are obtained the corresponding 1'-(p-fluorophenyl)-compounds.

In accordance with all of the above procedures, but starting with the 17α,20,20,21-bis(methylenedioxy)-2-hydroxymethylene-4-pregnene-derivative which is obtained from each of the starting materials which are defined by the formula on page 3 there are obtained the corresponding 1'-(p-fluorophenyl)- and 2'-(p-fluorophenyl)-derivatives.

*Example 9*

One gram of methyl 3,11-diketo-4,17(20)-pregnadiene-21-oate is dissolved in 10 ml. of absolute ethanol and 2 ml. of ethyl orthoformate. Fifty milligrams of 2,4-dinitrobenzenesulfonic acid is added and, after stirring at room temperature for forty-five minutes, the reaction mixture is neutralized with pyridine and taken to dryness finally under high vacuum. The crude residual 3-enol ethyl ether is of sufficient purity for the next step.

*Example 10*

Two hundred and fifty milligrams of the 3-enol ethyl ether of methyl 3,11-diketo-4,17(20)-pregnadiene-21-oate is dissolved in 5 ml. of dry pyridine. This mixture is cooled to —20° C. and perchloryl fluoride is bubbled through slowly for three minutes. It is then poured into ice and water and extracted several times with ethyl acetate. The organic layer is washed first with dilute hydrochloric acid and then with 5% sodium bicarbonate, and then dried. The residue, after removal of solvent, is a mixture of the 6α and 6β-fluoro-isomers and is used in the next step without purification.

*Example 11*

Three hundred and eighty-five milligrams of the crude 3-enol ethyl ether of methyl 3,11-diketo-4,17(20)-pregnadiene-21-oate is dissolved in 10 ml. of acetone containing 0.17 g. of sodium acetate dissolved in 1.7 ml. of water and the mixture is cooled to 0° C. N-chlorosuccinimide (170 mg.) is added, immediately followed by 0.17 ml. of glacial acetic acid. The reaction mixture is stirred in the ice bath for one and one-half hours and is then poured into ice water and extracted into ethyl acetate. Removal of the dried solvent leaves a residue containing methyl-6β-chloro-3,11-diketo - 4,17(20)-pregnadiene - 21-oate which is used directly in the next step.

*Example 12*

Two hundred milligrams of the crude methyl-6ξ-fluoro-3,11-diketo-4,17(20)-pregnadiene-21-oate are refluxed in a Dean-Stark water separator in 10 ml. of benzene with 0.5 ml. of pyrrolidine and 50 mg. of p-toluenesulfonic acid. After twenty-four hours, the cooled reaction mixture is extracted rapidly once with water, dried and taken to dryness. The residue is redissolved in 10 ml. of tetrahydrofuran, 200 mg. of lithium aluminum hydride are added and the mixture is refluxed for two hours. Water is cautiously added to the cooled reaction mixture, followed by ethyl acetate. The organic layer is separated and taken to dryness. The residue is refluxed for four hours with 0.75 g. of sodium acetate, 1 ml. of water, 0.4 ml. of glacial acetic acid and 10 ml. of methanol. Ethyl acetate and water are added and the separated and dried organic layer is taken to dryness. The residue is then treated with 1 ml. of acetic anhydride and 1 ml. of pyridine for eighteen hours at room temperature. Removal of these reagents under vacuum and chromatography on neutral alumina affords 6α-fluoro-11β,21-dihydroxy-4,17(20)-pregnadiene-3-one 21-acetate.

In accordance with the above procedure but starting with the crude methyl - 6 - chloro-3,11-diketo-4,17(20)-pregnadiene-21-oate, the 6α-chloro-11β,2-dihydroxy-4,17(20)-pregnadiene-3-one 21-acetate is obtained.

*Example 13*

21 - acetoxy-11β-hydroxy-4,17(20)-pregnadiene-3-one (3.70 g.) is heated and stirred at 75–100° C. with 1.1 to 2.2 grams of selenium dioxide in 135 ml. of dioxane and 15 ml. of water. When reaction to form the 21-acetoxy-11β,16α-dihydroxy-,4,17(20)-pregnadiene-3-one is at the maximal the solution is filtered with the aid of Super-cel (an infusorial earth) and taken to dryness. The residue is taken up in ethyl acetate and washed successively with aqueous sodium bicarbonate, ammonium sulfide, dilute aqueous ammonia, dilute hydrochloric acid and finally with water. The organic solvent is dried, treated with activated charcoal, taken to dryness and chromatographed on silica gel to afford 21-acetoxy-11β,16α-dihydroxy-4,17(20)-pregnadiene-3-one.

*Example 14*

A solution of 21-acetoxy-11β,16α-dihydroxy-4,17(20)-pregnadiene-3-one (400 mg.) in 10 ml. of ether and 1 ml. of tributylamine is treated with 0.2 ml. of thionyl chloride. After ten minutes, the solution is poured into iced sodium dihydrogen phosphate and extracted with ethyl acetate. Removal of the dried solvent leaves a residue which contains 20 - chloro-21-acetoxy-11β-hydroxy-4,16-pregnadiene-3-one. This is dissolved in 10 ml. of ethanol to which 1 N sodium chloride is added dropwise until alkalinity persists over a period of ten minutes. Then acetic acid is carefully added to neutrality and the solvent is removed in vacuo. The residue is dissolved in ethyl acetate, washed with water, and chromatographed on silica gel to afford 20,21-epoxy-11β-hydroxy-4,16-pregnadiene-3-one.

*Example 15*

To a solution of 200 mg. of 20,21-epoxy-11β-hydroxy-4,16-pregnadiene-3-one in 2 ml. of chloroform and 2 ml. of tetrahydrofuran in a polyethylene bottle at —60° C. is added 2 ml. of 2:1 (by weight) mixture of anhydrous hydrogen fluoride and tetrahydrofuran. After 4 hours at —10° C. the mixture is cooled to —60° C. and cautiously added to a stirred mixture of 30 ml. of 25% aqueous potassium carbonate and 25 ml. of chloroform kept at —5° C. The aqueous phase is further extracted with chloroform and the combined organic solvent is washed with sodium bicarbonate and dried. The residue after removal of solvent is treated at room temperature with one ml. of acetic anhydride and one ml. of pyridine. The reaction mixture is taken to dryness under high vacuum on a rotating evaporator and chromatographed on neutral alumina to afford 21-acetoxy-16α-fluoro-11β-hydroxy-4,17(20)-pregnadiene-3-one.

*Example 16*

A solution of 325 mg. of 21-acetoxy-16α-fluoro-11β-hydroxy-4,17(20)-pregnadiene-3-one is prepared in 10 ml. of t-butanol, 3 ml. of methylene chloride and 0.4 ml. of pyridine. To the solution is added 1.1 ml. of a solution of N-methylmorpholine oxide-hydrogen peroxide complex in t-butanol. A milligram of osmium tetroxide is added and the solution is stirred at room temperature overnight. Excess reagent is then destroyed by stirring the solution vigorously with aqueous sodium hydrosulfite. After filtration, the organic layer is washed with aqueous sodium dihydrogen phosphate and water, dried and removed under vacuum. Chromatography on Florisil affords 16α-fluoro-11β,17α-dihydroxy - 21 - acetoxy-4-pregnene-3,20-dione. Florisil is an activated magnesium silicate made according to U.S. Patent 2,393,625.

The N-methylmorpholine oxide-hydrogen peroxide is prepared by the following procedure: To a solution of 26 grams (0.25 mole) of N-methylmorpholine in 100 milliliters of tertiary butyl alcohol is added 34 grams (0.50 mole) of fifty percent hydrogen peroxide portionwise, with stirring, and while maintaining the reaction temperature at between thirty and 35 degrees centigrade with water bath. The resulting solution is then diluted to 170 millimeters with tertiary butyl alcohol, maintained at room temperature for 48 hours, and then dried with sixty grams of anhydrous magnesium sulfate for an additional 24 hours. The magnesium sulfate is removed by filtration and the filtrate is distilled to dryness to produce crystalline N-methylmorpholine peroxide. Alternatively, the solution can be titrated for available peroxide and the N-methylmorpholine oxide peroxide used without isolation.

*Example 17*

Five hundred milligrams of 21-acetoxy-16α-fluoro-11β,17α-dihydroxy-4-pregnene-3,20-dione is dissolved in a mixture of 5 ml. of benzene and 5 ml. of 1 N-methanolic potassium hydroxide and the solution is allowed to stand at room temperature for ten minutes. The solution is then acidified with acetic acid, diluted with ethyl acetate and washed with water. Removal of the dried solvent leaves a residue of 16α-fluoro-11β,17α,21-trihydroxy-4-pregnene-3,20-dione. This is stirred at room temperature for 70 hours with a mixture of 18 ml. of chloroform, 5 ml. of concentrated hydrochloric acid and 5 ml. of 37% formaldehyde. The chloroform layer is separated and the aqueous layer is extracted several more times with chloroform. The combined organic solvent is washed with aqueous sodium bicarbonate and dried. Removal of the solvent leaves a residue containing 17α,20,20,21-bismethylenedioxy - 16α - fluoro-4-pregnene-3,20-dione which is further purified by crystallization from methanol.

*Example 18*

A suspension of 17α,20,20,21 - bis(methylenedioxy)-16α-fluoro-4-pregnene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 17α,20,20,21-bis(methylenedioxy)-16α-fluoro-4,6-pregnadiene-3,20-dione.

Alternately, the 17α,20,20,21-bis(methylenedioxy)-16α-fluoro-4,6-pregnadiene-3,20-dione may be prepared by reaction of the 21-acetoxy-16α-fluoro-11β,17α-dihydroxy-4-pregnene-3,20-dione with chloranil according to the above reaction, and then treatment of the resulting 21-acetoxy-16α - fluoro - 11β,17α - dihydroxy-4,6-pregnadiene-3,20-dione first with methanolic potassium hydroxide, and then with formaldehyde in the presence of concentrated HCl using the procedure of Example 17.

In accordance with the procedures of Example 12 through 18 but starting in Example 12 with the 6α-methyl-21-acetoxy-11β-hydroxy-4,17(20)-pregnadiene-3-one, 6α-chloro-21-acetoxy-11β-hydroxy-4,17(20) - pregnadiene-3-one or the 6α-fluoro-21-acetoxy-11β-hydroxy-4,17(20)-pregnadiene-3-one, or the Δ⁴,⁶-analogues thereof, there are obtained the 6α-methyl, 6α-chloro and 6α-fluoro-17α,20,-20,21 - bis(methylenedioxy)-16α-fluoro-4-pregnene - 3,20-dione and the corresponding Δ⁴,⁶-analogues thereof.

*Example 19*

The 6 - halo-16α-fluoro-11β,17α-dihydroxy-4,6-pregnadiene-3,20-dione compounds used as starting materials in Example 2 are alternately prepared by the following procedures. (See Flow Sheet C.)

11-ketoprogesterone (10 g.) and chloranil (25 g.) are refluxed in 350 ml. of dry t-butanol for three hours. The residue after removal of the solvent is dissolved in chloroform and extracted thoroughly with 10% aqueous sodium bisulfite, 5% potassium hydroxide and finally water. Removal of the dried solvent and chromatography on neutral alumina affords 6-dehydro-11-ketoprogesterone.

A solution of 3.25 g. of 6-dehydro-11-ketoprogesterone in 325 ml. of methylene dichloride is cooled in an ice bath and treated with 75 ml. of 1.5 N ethereal monoperphthalic acid and allowed to stand over night at room temperature. The mixture is poured into excess sodium bicarbonate, and the organic layer is separated and dried. Removal of solvent and crystallization from a suitable solvent affords 6α,7α-oxido-11-ketoprogesterone.

6α,7α-oxido-11-ketoprogesterone (1.0 g.) in 75 ml. of glacial acetic acid is saturated at room temperature with anhydrous hydrogen chloride and allowed to stand for four hours at room temperature. It is then poured into water, extracted with chloroform and washed with water and sodium bicarbonate. Removal of the dried solvent and chromatography on neutral alumina affords 6-chloro-6-dehydro-11-ketoprogesterone.

6α,7α-oxido-11-ketoprogesterone (1.25 g.) is dissolved in 30 ml. of chloroform and treated with 12.5 ml. of a solution prepared from 7 parts of tetrahydrofuran, 4 parts of chloroform and 4 parts of anhydrous hydrogen fluoride. After three days at room temperature, the mixture is cautiously poured into iced potassium carbonate and extracted several times with chloroform. The organic layer is separated, dried and removed. The residue is taken up in 20 ml. of glacial acetic acid and 5 ml. of glacial acetic acid saturated with hydrogen fluoride gas is added. After one hour at room temperature, this mixture is poured into ice and water and extracted with ethyl acetate. After water and sodium bicarbonate washes, the dried solvent is removed and the residue is chromatographed on neutral alumina to afford 6-fluoro-6-dehydro-11-ketoprogesterone.

A solution of 9.0 g. of 6-chloro-6-dehydro-11-ketoprogesterone is prepared in 125 ml. of anhydrous t-butanol. To it is added with stirring 13.6 ml. of ethyl oxalate and 25 ml. of 2.5 N sodium methoxide in methanol at about 50° C. This mixture is stirred under nitrogen at room temperature over night. Then 3.06 g. of sodium acetate and 3.53 ml. of glacial acetic acid in 200 ml. of methanol are added. This solution is cooled in an ice bath and 10.8 g. of bromine in 110 ml. of methanol is added slowly over a half hour period. Then 57 ml. of 2.5 N methanolic sodium methoxide is added and the solution is stirred for five hours at room temperature. The mixture is then poured into water and the precipitate is filtered off and dried. Five grams of this material is dissolved in 100 ml. of benzene, 50 ml. of methanol and 10 ml. of glacial acetic acid. Five grams of zinc dust is added and the reaction mixture is stirred vigorously for four hours. The solids are filtered off and washed with ethyl acetate. The combined organic layer is extracted with dilute sodium bicarbonate and dried. Chromatography on silica gel affords methyl 6-chloro-3,11-diketo-4,6,17(20)-pregnatriene-21-oate.

The above compound is then converted into 21-acetoxy-6 - chloro - 11β,21 - dihydroxy - 4,6,17(20) - pregnatriene-3-one following in sequence the procedures of Examples 9 to 18, for the preparation of the corresponding Δ⁴ compounds.

The 21-acetoxy compound may be converted into the corresponding 21-hydroxy compound using sodium methoxide in methanol following the procedure of page 63.

*Example 20*

The 21 - acetoxy - 9α,11β - dichloro - 16α - fluoro-17α-hydroxy-4-pregnene-3,20-dione compounds and the 21 - acetoxy - 9α,11β - dichloro - 16α - fluoro - 6 - methyl-17α - hydroxy - 4,6 - pregnadiene - 3,20 - dione compounds used as starting materials in Examples 3 and 4 are prepared, starting with the 21-acetoxy-16α-fluoro-11β,17α-dihydroxy-4-pregnene-3,20-dione or the 21-acetoxy-16α-fluoro - 11β,17α - dihydroxy - 4,6 - pregnadiene - 3,20- dione, in accordance with the following procedures. (Compare Flow Sheet D.)

A solution of 400 mg. of 21-acetoxy-16α-fluoro-11β,17α - dihydroxy - 6 - methyl - 4,6 - pregnadiene - 3,20-dione in 2.0 ml. dimethyl formamide, 0.8 ml. of pyridine and 0.4 ml. of methanesulfonyl chloride is allowed to stand at 75° C. for one hour. The mixture is cooled and water is added. The precipitate formed is filtered, washed with water, dried in air and purified by chromatography on alumina and elution with benzene. Crystallization gives 21-acetoxy - 16α - fluoro-17α-hydroxy-6-methyl-4,6,9(11)-pregnatriene-3,20-dione.

N-chlorosuccinimide (160 mg.) is added to a solution of 21 - acetoxy - 16α - fluoro - 17α - hydroxy - 6 - methyl-4,6,9(11)-pregnatriene-3,20-dione (415 mg.) in 25 ml. of glacial acetic acid containing 2 g. of lithium chloride and 125 mg. of dry hydrogen chloride in one-half ml. of tetrahydrofuran. This solution is stirred in the dark for twenty minutes, washed with ice-water and dilute sodium bicarbonate, dried and then taken to dryness under vacuum. Chromatography on neutarl alumina affords 21 - acetoxy - 9α,11β - dichloro - 16α - fluoro - 17α - hydroxy-6-methyl-4,6-pregnadiene-3,20-dione.

*Example 21*

The 21 - acetoxy - 9α,16α - difluoro - 11β,17α - dihydroxy-4-pregnene-3,20-dione compounds and the 21-acetoxy - 9α,16α - difluoro - 11β,17α - dihydroxy - 4,6-pregnadiene-3,20-dione compounds used as starting materials in Example 5 are prepared in accordance with the following procedures.

A solution of 400 mg. of 21-acetoxy-16α-fluoro-11β, 17α - dihydroxy - 4 - pregnene-3,20-dione in 2.0 ml. dimethyl formamide, 0.8 ml. of pyridine and 0.4 ml. of methanesulfonyl chloride is allowed to stand at 75° C. for one hour. The mixture is cooled and water is added. The precipitate formed is filtered, washed with water, dried in air and purified by chromatography on alumina and elution with benzene. Crystallization gives 21-acetoxy - 16α - fluoro - 17α - hydroxy - 4,9(11) - pregnadiene-3,20-dione.

To a mixture of 620 mg. of 21-acetoxy-16α-fluoro-17α-hydroxy-4,9(11)-pregnadiene-3,20-dione and 330 mg. of N-bromosuccinimide in 10 ml. of dioxane, and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed under vacuum. About 30 ml. of water is added and the product is filtered, washed with water, and dried in air to give 21-acetoxy-9α-bromo-16α-fluoro-11β,17α-dihydroxy-4-pregnene-3,20-dione.

A solution of 210 mg. of 21-acetoxy-9α-bromo-16α-fluoro-11β,17α-dihydroxy-4-pregnene-3,20-dione and 240 mg. of potassium acetate in 10 ml. of absolute ethanol is heated under reflux for two hours. The reaction mixture is cooled to room temperature, and evaporated under vacuum to a small volume. The concentrated aqueous mixture is extracted with three portions of ethyl acetate, and the combined ethyl acetate extracts are washed with water, dried, and evaporated to dryness under vacuum. The residual material is crystallized from a mixture of ethyl acetate and ether to give 21-acetoxy-9α,11β-epoxy-16α-fluoro-17α-hydroxy-4-pregnene-3,20-dione.

To a solution of 200 mg. of 21-acetoxy-9α,11β-epoxy-16α-fluoro-17α-hydroxy-4-pregnene-3,20-dione in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from a mixture of acetone and ether gives 21-acetoxy-9α,16α-difluoro-11β,17α-dihydroxy-4-pregnene-3,20-dione.

A suspension of 21-acetoxy-9α,16α-difluoro-11β,17α-dihydroxy-4-pregnene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 21α-acetoxy-9α,16α-difluoro-11β,17α-dihydroxy-4,6-pregnadiene-3,20-dione.

*Example 22*

The 9α,11β-dichloro-16α-fluoro-17α-hydroxy-20-oxo-4-pregneno-[3,2-c]pyrazole (37.3 mg.) is treated with 3 ml. of acetic anhydride and 1 ml. of a solution of 304 mg. of p-toluenesulfonic acid monohydrate dissolved in 10 ml. of acetic anhydride. The mixture is kept at room temperature for 20 hours. The solvent is removed under vacuum. The residue is dissolved in 1 ml. of ether which has been washed once with 1 ml. of water. The aqueous phase is back-extracted twice with 1 ml. of ether. The combined ethereal extracts are washed once with 2 ml. of 10% sodium bicarbonate solution. The aqueous phase is then back-extracted with 1 ml. of ether. The combined ether extracts are washed with 1 ml. of water. The aqueous extract is back-extracted with 1 ml. of ether. The combined ethereal extracts are dried over magnesium sulfate, filtered and the solvent removed on a steam bath to give 17α-acetoxy-9α,11β-dichloro-16α-fluoro-20-oxo-4-pregneno-[3,2-c]pyrazole N-acetate.

The 17α - acetoxy-9α,11β-dichloro-16α-fluoro-20-oxo-4-pregneno-[3,2-c]pyrazole N-acetate is dissolved in 3.0 ml. of methanol and treated with 0.13 ml. of 0.1 N sodium hydroxide. The mixture is heated at reflux temperature for 30 minutes. The solvent is removed on a steam bath to give a crude product which is treated with 1 ml. of water and then extracted with 1 ml. of ether. The layers are separated and the aqueous phase is back extracted three times with 1 ml. of ether. The combined ether extracts are washed with 1 ml. of water. The organic phase is dried over magnesium sulfate, filtered and the solvent removed. The product is crystallized from methanol to give 23.0 mg. of 17α-acetoxy-9α,11β-dichloro-16α-fluoro-20-oxo-4-pregneno-[3,2-c]pyrazole.

In accordance with the above procedure, but starting with the 17α-hydroxy-9α,11β-dichloro-16α-fluoro-20-oxo-4,6-pregnadieno-[3,2-c]pyrazole the 17α-acetoxy-9α,11β-dichloro-16α-fluoro - 20 - oxo-4,6-pregnadieno-[3,2-c]pyrazole is obtained.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group consisting of compounds having structural formulas A and B:

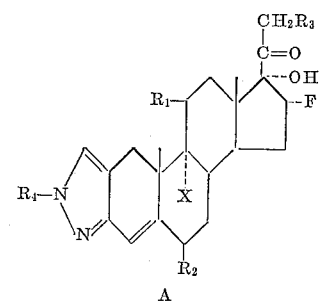

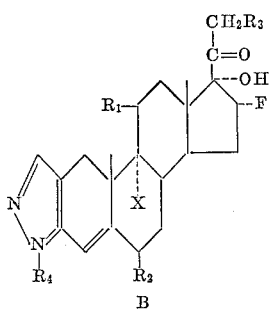

and the $\Delta^{4,6}$-analogues of said compounds, wherein $R_1$ is a member of the group consisting of β-halogen, β-hydroxy and keto, but β-halogen is present at $R_1$ only when X is halogen, $R_2$ is a member of the group consisting of hydrogen, fluoro, chloro, and methyl $R_3$ is a member of the group consisting of hydrogen, hydroxy, lower hydrocarbon carboxylic acyloxy, fluoro, iodo, the dihydrogen phosphate and the alkali metal salts of said dihydrogen phosphate, and the methyl-sulfonyloxy-radical, $R_4$ is a member of the group consisting of hydrogen, lower hydrocarbon carboxylic acyl, lower alkyl, lower aralkyl, lower cycloalkyl, aryl, pyridyl, pyridyloxide, thiophene and pyrimidyl, and X is a member of the group consisting of hydrogen and halogen; and pharmaceutically acceptable salts of the foregoing compounds.

2. 9α,16α - difluoro - 11β,17α,21-trihydroxy-20-oxo-4-pregneno-[3,2-c]pyrazole.

3. 11β,17α,21-trihydroxy - 6,16α - difluoro-20-oxo-4,6-pregnadieno-[3,2-c]pyrazole.

4. 16α - fluoro-11β,17α,21-trihydroxy-6-methyl-20-oxo-4,6-pregnadieno-[3,2-c]pyrazole.

5. 9α,11β-dichloro - 6,16α - difluoro-17α,21-dihydroxy-20-oxo-4,6-pregnadieno-[3,2-c]pyrazole.

6. 16α - fluoro-11β,17α,21-trihydroxy-20-oxo-2'-phenyl-4-pregneno-[3,2-c]pyrazole.

7. 16α - fluoro - 11β,17α,21 - trihydroxy-20-oxo-2'-(p-fluorophenyl)-4,6-pregnadieno-[3,2-c]pyrazole.

8. 6,16α - difluoro - 11β,17α,21 - trihydroxy-20-oxo-2'-phenyl-4,6-pregnadieno-[3,2-c]pyrazole.

9. 6 - methyl-16α-fluoro-11β,17α,21-trihydroxy-20-oxo-2'-phenyl-4,6-pregnadieno-[3,2-c]pyrazole.

10. 6 - chloro - 16α - fluoro-11β,17α,21-trihydroxy-20-oxo-2'-phenyl-4,6-pregnadieno-[3,2-c]pyrazole.

11. 6,16α-difluoro-11β,17α-dihydroxy-20-oxo-2'-phenyl-4,6-pregnadieno-[3,2-c]pyrazole.

12. 6 - methyl-16α-fluoro-11β,17α-dihydroxy-20-oxo-2'-phenyl-4,6-pregnadieno-[3,2-c]pyrazole.

13. 9α,11β-dichloro - 6 - methyl-16α-fluoro-11β,17α,21-trihydroxy-20-oxo-2' - phenyl-4,6-pregnadieno-[3,2-c]pyrazole.

14. 9α,11β - dichloro - 6,16α-difluoro-11β,17α,21-trihydroxy-20-oxo-2'-phenyl-4,6-pregnadieno-[3,2-c]pyrazole.

15. 9α,11β-dichloro - 6 - methyl-16α-fluoro-11β,17α-dihydroxy-20-oxo-2'-phenyl - 4,6 - pregnadieno-[3,2-c]pyrazole.

References Cited in the file of this patent
UNITED STATES PATENTS 2,945,852     Bergstrom     July 19, 1960